United States Patent
Chang et al.

(10) Patent No.: US 12,217,436 B2
(45) Date of Patent: Feb. 4, 2025

(54) ELECTRONIC DEVICE FOR DETECTING LOCATION, AND METHOD THEREFOR

(71) Applicant: Samsung Electronics Co., Ltd., Gyeonggi-do (KR)

(72) Inventors: Dukhyun Chang, Gyeonggi-do (KR); Taeyoon Kim, Gyeonggi-do (KR); Youngpo Lee, Gyeonggi-do (KR); Hyeonggeon Lee, Gyeonggi-do (KR); Chaiman Lim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 439 days.

(21) Appl. No.: 17/750,561

(22) Filed: May 23, 2022

(65) Prior Publication Data

US 2022/0284596 A1 Sep. 8, 2022

Related U.S. Application Data

(63) Continuation of application No. PCT/KR2020/012022, filed on Sep. 7, 2020.

(30) Foreign Application Priority Data

Nov. 29, 2019 (KR) .................. 10-2019-0157417

(51) Int. Cl.
*G06T 7/246* (2017.01)
*G06T 7/11* (2017.01)
(Continued)

(52) U.S. Cl.
CPC ............... *G06T 7/246* (2017.01); *G06T 7/11* (2017.01); *G06V 10/25* (2022.01); *G06V 10/761* (2022.01)

(58) Field of Classification Search
CPC ............ G06T 7/246; G06T 7/11; G06V 10/25; G06V 10/761
See application file for complete search history.

(56) References Cited

U.S. PATENT DOCUMENTS 8,798,924 B2   8/2014   Haverinen
9,080,874 B2   7/2015   Haverinen
(Continued)

FOREIGN PATENT DOCUMENTS

EP   3785049 B1 *   5/2024   ......... G01C 19/5614
EP   4375815 A1 *   5/2024   ........... G06F 3/0346
(Continued)

*Primary Examiner* — Adam D Houston
(74) *Attorney, Agent, or Firm* — Cha & Reiter, LLC

(57) ABSTRACT

According to certain embodiments, an electronic device comprises: a sensor module configured to sense sensing data; a wireless communication module configured to transmit and/or receive a wireless signal; a memory configured to store a virtual marker platform; and a processor operatively connected with the sensor module and the memory, wherein the processor is configured to perform a plurality of operations, the plurality of operations comprising: estimating a moving direction of the electronic device; performing first alignment of aligning a direction of a coordinate axis of measurement data, obtained to determine whether the electronic device enters a first region where a virtual marker is registered, with respect to the moving direction; performing second alignment of aligning the direction of the coordinate axis of the measurement data in a direction of a coordinate axis of the electronic device when generating a registered virtual marker; and determining entry of the electronic device into a specific region based on the registered virtual marker.

20 Claims, 18 Drawing Sheets

(51) Int. Cl.
*G06V 10/25* (2022.01)
*G06V 10/74* (2022.01)

(56) References Cited

U.S. PATENT DOCUMENTS

| | | |
|---|---|---|
| 9,151,621 B2 | 10/2015 | Haverinen |
| 9,167,440 B2 | 10/2015 | Kim et al. |
| 9,453,932 B2 | 9/2016 | Kim et al. |
| 10,288,431 B2 | 5/2019 | Kourogi et al. |
| 11,895,616 B2 * | 2/2024 | Joo ................... H04W 4/025 |
| 2004/0203853 A1 * | 10/2004 | Sheynblat ............... G01S 1/026 |
| | | 455/12.1 |
| 2007/0150195 A1 | 6/2007 | Koskan et al. |
| 2014/0286534 A1 | 9/2014 | Haverinen |
| 2015/0045072 A1 * | 2/2015 | Chao ..................... G01S 19/42 |
| | | 455/456.6 |
| 2015/0097554 A1 | 4/2015 | Park |
| 2015/0100589 A1 * | 4/2015 | Hassan ................. H04W 4/029 |
| | | 707/748 |
| 2015/0118987 A1 * | 4/2015 | Deason ............. H04M 3/42348 |
| | | 455/404.1 |
| 2015/0260523 A1 | 9/2015 | Haverinen |
| 2016/0116290 A1 | 4/2016 | Haverinen et al. |
| 2020/0019580 A1 * | 1/2020 | Kim ..................... G06F 16/9537 |
| 2022/0201427 A1 * | 6/2022 | Rechenberger ....... H04W 4/025 |
| 2022/0295223 A1 * | 9/2022 | Palos ..................... G06F 1/3209 |

FOREIGN PATENT DOCUMENTS

| | | | | |
|---|---|---|---|---|
| EP | 4390467 A1 * | 6/2024 | ............ | G01B 7/004 |
| JP | 2010-281579 A | 12/2010 | | |
| JP | WO2014-010727 A1 | 1/2014 | | |
| KR | 10-2013-0063821 A | 6/2013 | | |
| KR | 2015-0040140 B1 | 6/2015 | | |
| KR | 10-2016-0035637 A | 4/2016 | | |
| KR | 10-2017-0084637 A | 7/2017 | | |
| WO | WO-2015020771 A1 * | 2/2015 | ........... | G01C 21/206 |
| WO | WO-2023030660 A1 * | 3/2023 | ............... | G01C 1/00 |

\* cited by examiner

| ONE-DIMENSIONAL VIRTUAL MARKER 201 | | | | | | |
|---|---|---|---|---|---|---|
| Sampling Rate | | Length | | | | |
| Timestamp 1 | $MagX_1$ | | $MagY_1$ | | $MagZ_1$ | |
| : | : | | : | | : | |
| Timestamp N | $MagX_N$ | | $MagY_N$ | | $MagZ_N$ | |
| Sampling Rate | | Length | | | | |
| Timestamp 1 | $AccX_1$ | | $AccY_1$ | | $AccZ_1$ | |
| : | : | | : | | : | |
| Timestamp N | $AccX_N$ | | $AccY_N$ | | $AccZ_N$ | |
| Sampling Rate | | Length | | | | |
| Timestamp 1 | $Roll_1$ | $Pitch_1$ | $Yaw_1$ | $AnvX_1$ | $AnvY_1$ | $AnvZ_1$ |
| : | : | : | : | : | : | : |
| Timestamp N | $Roll_N$ | $Pitch_N$ | $Yaw_N$ | $AnvX_N$ | $AnvY_N$ | $AnvZ_N$ |
| Number of WLAN Aps | | | | | | |
| AP1 signal strength | | ... | | APN signal strength | | |
| Number of Cell Number | | | | | | |
| Cell1 signal strength | | ... | | CellN signal strength | | |

- MAGNETIC SENSING VALUE 210
- ACCELERATION SENSING VALUE 220
- GYRO SENSING VALUE 230
- FIRST WIRELESS COMMUNICATION SIGNAL 240
- SECOND WIRELESS COMMUNICATION SIGNAL 250

FIG.2

ELECTRONIC DEVICE FOR DETECTING LOCATION, AND METHOD THEREFOR

CROSS-REFERENCE TO RELATED APPLICATION(S)

This application is a continuation of International Application No. PCT/KR2020/012022 filed on Sep. 7, 2020 which claims priority to Korean Patent Application No. 10-2019-0157417 filed on Nov. 29, 2019 in the Korean Intellectual Property Office.

BACKGROUND

Technical Field

Certain embodiments disclosed in the disclosure relate to an electronic device for detecting entry into a specific region and a method therefor.

Description of Related Art

To detect an indoor location of an electronic device, the electronic device may use a positioning or localization technology of transmitting cellular and/or wireless LAN signal(s) received by the electronic device to a server and tracking location(s) of the electronic device and/or a user based on locations of cellular and/or wireless LAN base stations. The electronic device may use a geofencing technology of determining whether it enters a specific point-of-Interest (POI) using a wireless signal footprint.

An electronic device may register data defining a specific region in the interior as a virtual marker VM. The electronic device may face a direction in the specific region when registering the virtual marker. The virtual marker may be data including vector values. The vector values corresponds to a direction the electronic device faces when the virtual marker is registered. For example, the virtual marker may include magnetic field values corresponding to a direction the electronic device faces when the virtual marker is registered.

When entering the specific region, the electronic device may enter the specific region in a different direction from the direction where the virtual marker is registered. When the electronic device enters the specific region in the different direction from the direction where the virtual marker is registered, vector values measured by the electronic device may have a coordinate axis different from a coordinate axis of the virtual marker. When the virtual marker and the measurement data have different coordinate axes, it is difficult to compare a vector value of the virtual marker with a vector value of the measurement data to accurately detect whether the electronic device enters the specific region.

Certain embodiments disclosed in the disclosure are to provide a technology capable of improving the accuracy of determining whether an electronic device enters a specific region where a virtual marker is registered.

SUMMARY

According to certain embodiments, a method for determining entry of an electronic device into a specific region, comprises: estimating a moving direction of the electronic device; aligning a coordinate axis of measurement data, obtained to determine whether the electronic device enters a first region where a virtual marker is registered, in the moving direction; aligning a direction of the coordinate axis of the measurement data in a direction of a coordinate axis of the electronic device when generating a registered virtual marker, and determining entry of the electronic device into the specific region based on the registered virtual marker.

According to certain embodiments, an electronic device comprises: a sensor module configured to sense sensing data; a wireless communication module configured to transmit and/or receive a wireless signal; a memory configured to store a virtual marker platform; and a processor operatively connected with the sensor module and the memory, wherein the processor is configured to perform a plurality of operations, the plurality of operations comprising: estimating a moving direction of the electronic device; performing first alignment of aligning a direction of a coordinate axis of measurement data, obtained to determine whether the electronic device enters a first region where a virtual marker is registered, with respect to the moving direction; performing second alignment of aligning the direction of the coordinate axis of the measurement data in a direction of a coordinate axis of the electronic device when generating a registered virtual marker; and determining entry of the electronic device into a specific region based on the registered virtual marker.

According to certain embodiments, a non-transitory computer-readable medium storing a plurality of instructions, where execution of the plurality of instructions by one or more processors causes the one or more processors to perform a plurality of operations comprising: estimating a moving direction of an electronic device; aligning a coordinate axis of measurement data, obtained to determine whether the electronic device enters a first region where a virtual marker is registered, in the moving direction; aligning a direction of the coordinate axis of the measurement data in a direction of a coordinate axis of the electronic device when generating a registered virtual marker, and determining entry of the electronic device into a specific region based on the registered virtual marker.

DESCRIPTION OF DRAWINGS

FIG. 2 is a drawing illustrating a one-dimensional virtual marker according to an embodiment;

With regard to description of drawings, the same or similar denotations may be used for the same or similar components.

DETAILED DESCRIPTION

Hereinafter, certain embodiments of the disclosure may be described with reference to accompanying drawings. However, it should be understood that this is not intended to limit the disclosure to specific implementation forms and includes various modifications, equivalents, and/or alternatives of embodiments of the disclosure.

According to embodiments disclosed in the disclosure, the electronic device may align data measured by the electronic device in a direction where the electronic device progresses. The electronic device may align data measured by the electronic device in a certain direction from an electronic device point of view irrespective of a direction where the electronic device progresses.

Furthermore, according to embodiments disclosed in the disclosure, the electronic device may align data measured by the electronic device in the direction of a registered virtual marker when the electronic device enters a specific region. The electronic device may determine whether the electronic device enters a specific region irrespective of a direction where the electronic device enters the specified region.

Furthermore, according to embodiments disclosed in the disclosure, the electronic device may accurately measure whether the electronic device progresses in any direction using less data than before.

In addition, various effects ascertained directly or indirectly through the disclosure may be provided.

Figure 1:
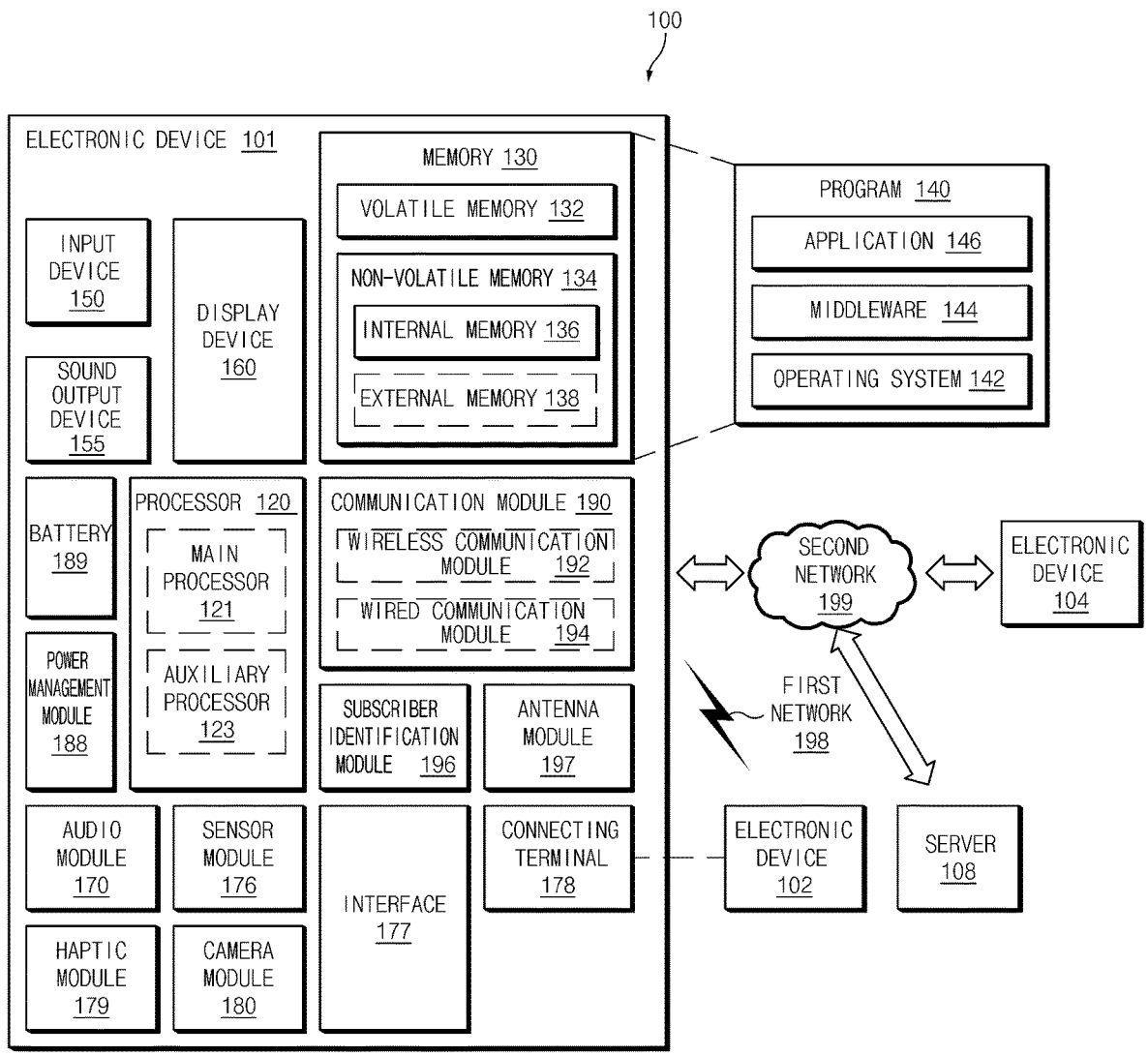
FIG. 1 is a block diagram illustrating an electronic device in a network environment according to certain embodiments.

FIG. 1 describes an electronic device where certain embodiments of this disclosure can be practiced.

Electronic Device

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (MI) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The term "processor" shall be understood to refer to both the singular and plural contexts in this document.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device 101 can be positioned using a Global Position System (GPS). However, positioning can be more complex with the electronic device 101 is located indoors. In an indoor environment, GPS signals are either blocked or reflected. Accordingly, the electronic device 101 may use positioning or localization technology of transmitting cellular and/or wireless LAN signal(s) received by the electronic device when the electronic device is indoors.

An electronic device may register data defining a specific region when inside, known as a virtual marker VM. The electronic device may face a direction in the specific region when registering the virtual marker. The virtual marker may be data including vector values. The vector values correspond to a direction the electronic device faces when the virtual marker is registered. For example, the virtual marker may include magnetic field values corresponding to a direction the electronic device faces when the virtual marker is registered.

FIG. 2 describes a virtual marker.

Virtual Marker

FIG. 2 is a drawing 200 illustrating a one-dimensional virtual marker 201 according to an embodiment.

Referring to FIG. 2, the one-dimensional virtual marker 201 may include sensing values. The sensing values may include information in the form of a one-dimensional line among virtual markers (VMs) displaying information about a specific space and/or location. The one-dimensional virtual marker 201 may be stored in a memory (e.g., a memory 130 of FIG. 1) of an electronic device (e.g., an electronic device 101 of FIG. 1). The one-dimensional virtual marker 201 may include magnetic sensing values taken at different sampled times (Timestamp 1 . . . N) 210, an acceleration sensing values taken at different sampled times (Timestamp 1 . . . N) 220, a gyro sensing values taken at different sampled times (Timestamp 1 . . . N) 230, a value of a first wireless communication signal 240, and/or a value of a second wireless communication signal 250.

In an embodiment, the magnetic sensing value 210 may include a magnitude value for each direction of a magnetic field which is measured at a specific speed in a specific space and/or location according to a specified sampling rate. To measure the magnetic sensing value 210, a magnitude value for each direction of the magnetic field may be measured. A time when the magnitude value for each direction of the magnetic field is measured during one time may be set to a length value. For example, when the sampling rate is 1 Hz and when the length is 0.1 seconds, the electronic device 101 may measure a magnitude value for each direction of the magnetic field for 0.1 seconds every second. The measurement of the magnitude value for each direction of the magnetic field may be maintained for 0.1 seconds for one time. Thus, the measurement of the magnetic field may be performed for 0 second to 0.1 seconds, 1.0 second to 1.1 seconds, . . . , N.0 seconds to N.1 seconds (where N is a natural number).

In an embodiment, the electronic device 101 may measure a magnetic field in a specific space and/or location using a magnetic field sensor included in a sensor module (e.g., a sensor module 176 of FIG. 1). For example, the sensor module 176 may measure a magnetic field from a first time timestamp 1 to an Nth (where N is a natural number) time timestamp N. In this case, the magnetic sensing value 210 may include strength MagX1 in an X-axis direction of a magnetic field measured at the first time timestamp 1, strength MagY1 in a Y-axis direction of the magnetic field measured at the first time timestamp 1, and strength MagZ1 in a Z-axis direction of the magnetic field measured at the first time timestamp 1. Furthermore, the magnetic sensing value 210 may include strength MagXN in the X-axis direction of a magnetic field measured at the Nth time timestamp N, strength MagYN in the Y-axis direction of the magnetic field measured at the Nth time timestamp N, and strength MagZN in the Z-axis direction of the magnetic field measured at the Nth time timestamp N.

In an embodiment, the acceleration sensing value 220 may include a magnitude value for each direction of acceleration of the electronic device 101, which is measured at a specific speed in a specific space and/or location according to a specified sampling rate. To measure the acceleration sensing value 220, a magnitude value for each direction of the acceleration may be measured during a specified length. A time when the magnitude value for each direction of the acceleration is measured for one time may be set to a length value.

In an embodiment, the electronic device 101 may measure acceleration in a specific space and/or location from the first time timestamp 1 to the Nth time timestamp N using an accelerometer included in the sensor module 176. For example, the acceleration sensing value 220 may include acceleration AccX1 in an X-axis direction of the electronic device 101, which is measured at the first time timestamp 1, acceleration AccY1 in a Y-axis direction of the electronic device 101, which is measured at the first time timestamp 1, and acceleration AccZ1 in a Z-axis direction of the electronic device 101, which is measured at the first time timestamp 1. For another example, the acceleration sensing value 220 may include acceleration AccXN in the X-axis direction of the electronic device 101, which is measured at the Nth time timestamp N, acceleration AccYN in the Y-axis direction of the electronic device 101, which is measured at the Nth time timestamp N, and acceleration AccZN in the Z-axis direction of the electronic device 101, which is measured at the Nth time timestamp N.

In an embodiment, the gyro sensing value 230 may include an angle orientation value formed with the ground of the electronic device 101, which is measured in a specific space and/or location according to a specified sampling rate. To measure the gyro sensing value 230, an angle orientation value may be measured according to a specified length. A time when a magnitude value for each direction of an orientation is measured for one time may be set to a length value.

In an embodiment, the electronic device 101 may measure an angle orientation value formed with the ground in a specific space and/or location from the first time timestamp 1 to the Nth time timestamp N using a gyroscope included in the sensor module 176. For example, the gyro sensing value 230 may include a role value Roll1 of the electronic device 101, which is measured at the first time Timestamp 1, a pitch value Pitch1 of the electronic device 101, which is measured at the first time Timestamp 1, and a yaw value Yaw1 of the electronic device 101, which is measured at the first time Timestamp 1. For another example, the gyro sensing value 230 may include a role value RollN of the electronic device 101, which is measured at the Nth time Timestamp N, a pitch value PitchN of the electronic device 101, which is measured at the Nth time Timestamp N, and a yaw value YawN of the electronic device 101, which is measured at the Nth time Timestamp N.

In an embodiment, the gyro sensing value 230 may include a magnitude value for each direction of angular acceleration of the electronic device 101, which is measured at a specific speed in a specific space and/or location according to a specified sampling rate. The gyro sensing value 230 may measure a magnitude value for each direction of the angular acceleration for one time depending on a specified length. The electronic device 101 may measure angular acceleration in a specific space and/or location from the first time timestamp 1 to the Nth time timestamp N using the gyroscope included in the sensor module 176. For example, the gyro sensing value 230 may include angular acceleration AnvX1 in the X-axis direction of the electronic device 101, which is measured at the first time timestamp 1, angular acceleration AnvY1 in the Y-axis direction of the electronic device 101, which is measured at the first time timestamp 1, and angular acceleration AnvZ1 in the Z-axis direction of the electronic device 101, which is measured at the first time timestamp 1. For another example, the gyro sensing value 230 may include angular acceleration AccXN in the X-axis direction of the electronic device 101, which is measured at the Nth time timestamp N, angular acceleration AnvYN in the Y-axis direction of the electronic device 101, which is measured at the Nth time timestamp N, and angular acceleration AnvZN in the Z-axis direction of the electronic device 101, which is measured at the Nth time timestamp N.

According to an embodiment, the first wireless communication signal 240 may be a strength value of an access point (AP) signal measured by a wireless communication module (e.g., a wireless communication module 192 of FIG. 1). The first wireless communication signal 240 may include information associated with the number of AP signals of a broadband LAN (WLAN). The first wireless communication signal 240 may include information associated with a strength of an AP signal measured in a specific space and/or location. For example, the first wireless communication signal 240 may include a value from a strength (AP 1 signal strength) of a first AP signal to a strength (APN signal strength) of an Nth AP signal.

In an embodiment, the second wireless communication signal 250 may be a strength value of a cell signal of cellular communication, which is measured by the wireless communication module 192. The second wireless communication signal 250 may include information associated with the number of cells. The second wireless communication signal 250 may include information associated with strengths of first to Nth cell signals measured in a specific space and/or location. For example, the second wireless communication signal 250 may include a value from a strength (Celli signal strength) of a first cell signal to a strength (cellN signal strength) of an Nth cell signal.

In an embodiment, a processor (e.g., a processor 120 of FIG. 1) of the electronic device 101 may determine a radius of a specific space to generate the one-dimensional virtual marker 201. The processor 120 may collect sensing values within the radius of the specific space depending on movement of the electronic device 101 within the radius of the specific space using the sensor module 176 and may simultaneously receive the first wireless communication signal 240 and/or the second wireless communication signal 250 using the wireless communication module 192.

In an embodiment, the processor 120 of the electronic device 101 may perform image processing in a camera (e.g., a camera 180 of FIG. 1) which supports an augmented reality (AR) technology to spatially match the specified space with the sensing values, thus estimating a relative location of the electronic device 101.

In an embodiment, the one-dimensional virtual marker 201 may be generated using the sensing and wireless communication signal values 210, 220, 230, 240, and 250, but not limited thereto. The shape of the virtual marker may be a one-dimensional line, a two-dimensional plane, or a three-dimensional space.

In an embodiment, the one-dimensional virtual marker 201 may include movement information of the electronic device 101, for example, sensing values changed while the electronic device 101 moves, a speed of the electronic device 101, and/or an orientation of the electronic device 101. The one-dimensional virtual marker 201 may include a feature of a specified space. When the electronic device 101 generates the one-dimensional virtual marker 201 in the interior, the one-dimensional virtual marker 201 may reflect a feature associated with a shape of an indoor structure and/or a physical feature of an object disposed in the interior. For example, the one-dimensional virtual marker 201 may reflect a shape of a structure, such as a steel frame, stairs, and/or a wall, in the interior. For another example, the one-dimensional virtual marker 201 may reflect a material characteristic of an object such as furniture disposed in the interior.

In an embodiment, the one-dimensional virtual marker 201 may store magnetic field information in which indoor structure information is reflected. The one-dimensional virtual marker 201 may store an acceleration value and/or rotational motion information of the electronic device 101. The one-dimensional virtual marker 201 may store surrounding wireless signal information in conjunction with optimization of the power consumption of the electronic device 101. For example, the one-dimensional virtual marker 201 may store WiFi signal information and/or cellular signal information. The first to Nth times Timestamp 1 to Timestamp N in the one-dimensional virtual marker 201 may be stored as time values set to measure the sensing values 210, 220, 230, 240, and 250, such as magnetic field information, every specified period.

In an embodiment, although not illustrated, the one-dimensional virtual marker 201 may additionally include a latitude value and a longitude value of the electronic device 101. The latitude value and the longitude value of the electronic device 101 may be measured from the first time Timestamp 1 to the Nth time Timestamp N using a global positioning system (GPS) included the sensor module 176 or the wireless communication module 192. The latitude value may include a first latitude value measured at the first time Timestamp 1 and an Nth latitude value measured at the Nth time Timestamp N. The longitude value 270 may include a first longitude value measured at the first time Timestamp 1 and an Nth longitude value measured at the Nth time Timestamp N.

However, the vector values may correspond to a direction the electronic device faces when the virtual marker is registered. For example, the magnetic sensing values 210, MagX, MagY, and MagZ may be based on a coordinate system based on the direction that the electronic device 101 enters a specific region.

However, the electronic device may enter the specific region in a different direction from the direction where the virtual marker is registered. When the electronic device enters the specific region in the different direction from the direction where the virtual marker is registered, vector values measured by the electronic device may have a coordinate axis different from a coordinate axis of the virtual marker. That is, the X axis, Y axis, and Z When the virtual marker and the measurement data have different coordinate axes, it is difficult to compare a vector value of the virtual marker with a vector value of the measurement data to accurately detect whether the electronic device enters the specific region.

The virtual markers of FIG. 2 can be set for specific location inside. At a later time, the virtual markers can be used as references to determine the location of the electronic device indoors. That is, when the electronic device 101 has similar measurements as a virtual marker, it can be deemed that the electronic device is in proximity with the location of the virtual marker.

Figure 3:
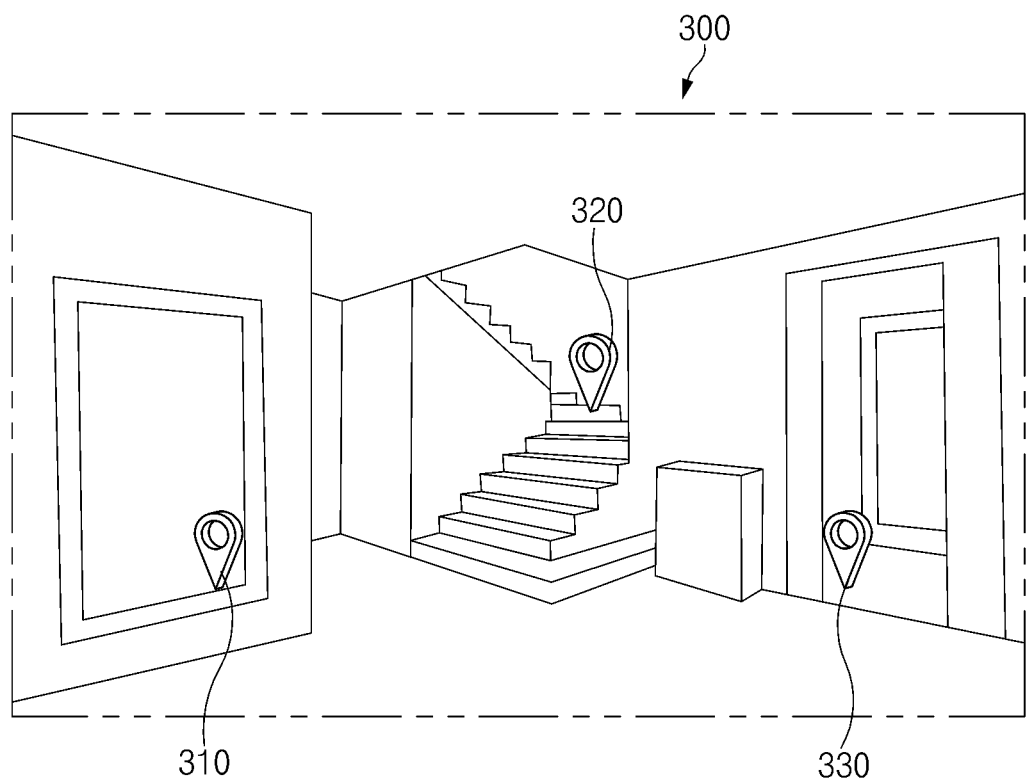
FIG. 3 is a drawing illustrating a method for setting virtual markers at specific locations according to an embodiment.

FIG. 3 is a drawing 300 illustrating a method for setting virtual markers 310, 320, and 330 at specific locations according to an embodiment.

In an embodiment, the virtual markers 310, 320, and 330 may be data corresponding to specific places. For example, the virtual markers 310, 320, and 330 may be data corresponding to a small region, a detailed location, and/or a short path among the specific places. The virtual markers 310, 320, and 330 may be stored in a memory (e.g., a memory 130 of FIG. 1) of an electronic device (e.g., an electronic device 101 of FIG. 1). The virtual marker 310, 320, or 330 may include a magnetic sensing value (e.g., a magnetic sensing value 210 of FIG. 2), an acceleration sensing value (e.g., an acceleration sensing value 220 of FIG. 2), a gyro sensing value (e.g., a gyro sensing value 230 of FIG. 2), a first wireless communication signal (e.g., a first wireless communication signal 240 of FIG. 2), and/or a second wireless communication signal (e.g., a second wireless communication signal 250 of FIG. 2) in a small region, a detailed location, and/or a short path.

In an embodiment, the magnetic sensing value 210, the first wireless communication signal 240, and/or the second wireless communication signal 250 in the small region, the detailed location, and/or the short path, which are/is included in the virtual markers 310, 320, or 330, may change depending on an indoor structure. For example, the magnetic sensing value 210, the first wireless communication signal 240, and/or the second wireless communication signal 250 may change depending on a framework of a building and/or a material of a structure. For another example, the magnetic sensing value 210, the first wireless communication signal 240, and/or the second wireless communication signal 250 may change depending on a shape and/or a material of an object disposed in the interior.

In an embodiment, when the virtual markers 310, 320, and 330 correspond to a short path, the short path may be a path having a length of about 30 cm or more and about 70 cm or less. The virtual marker 310, 320, or 330 may be data corresponding to a specific place in the interior and/or an object disposed in the interior. The virtual markers 310, 320, and 330 may include the first virtual marker 310, the second virtual marker 320, and/or the third virtual marker 330, which are/is data corresponding to specific place(s) in the interior and/or object(s) disposed in the interior. For example, a user may define the first virtual marker 310 may define the first virtual marker 310 as the front of a mirror. For another example, the user may define the second virtual marker 320 as an upper surface of a stair. For another example, the user may define the third virtual marker 330 as a front of a door.

Figure 4:
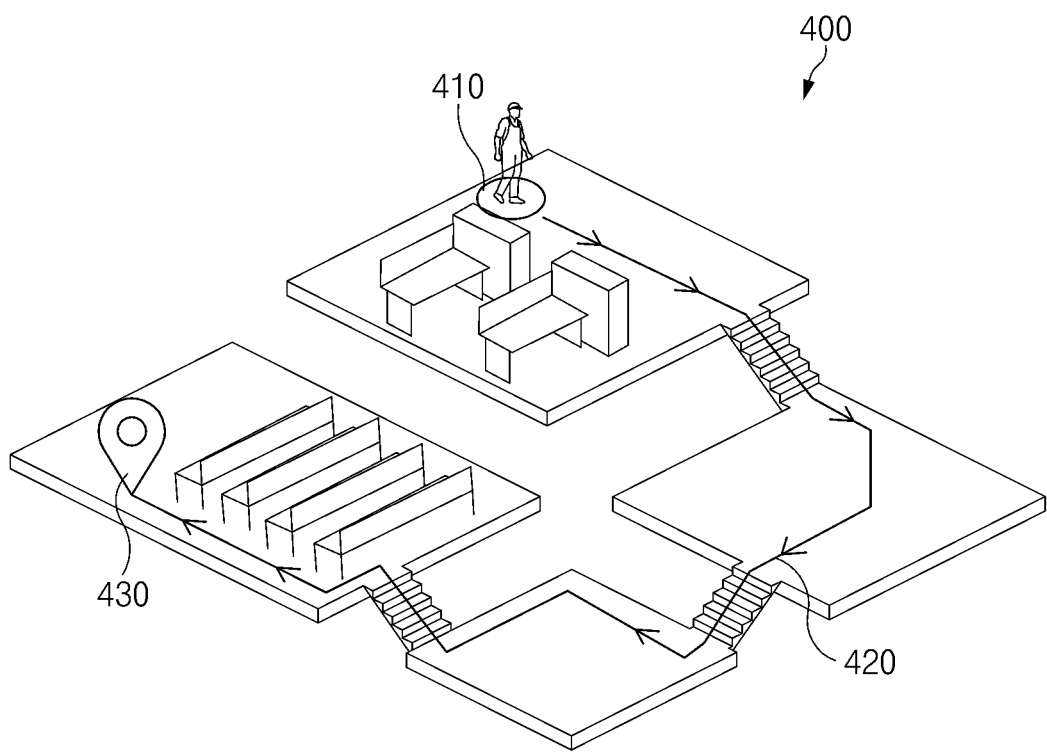
FIG. 4 is a drawing illustrating a method for setting virtual markers on a specific route according to an embodiment.

FIG. 4 is a drawing 400 illustrating a method for setting virtual markers 410, 420, and 430 on a specific route according to an embodiment.

In an embodiment, the virtual markers 410, 420, and 430 may be data corresponding to specific places. For example, the virtual markers 410, 420, and 430 may be data corresponding to a long path among the specific places. The virtual markers 410, 420, and 430 may be stored in a memory (e.g., a memory 130 of FIG. 1) of an electronic device (e.g., an electronic device 101 of FIG. 1). The virtual marker 410, 420, or 430 may include a magnetic sensing value (e.g., a magnetic sensing value 210 of FIG. 2), an acceleration sensing value (e.g., an acceleration sensing value 220 of FIG. 2), a gyro sensing value (e.g., a gyro sensing value 230 of FIG. 2), a first wireless communication signal (e.g., a first wireless communication signal 240 of FIG. 2), and/or a second wireless communication signal (e.g., a second wireless communication signal 250 of FIG. 2) in a long path.

In an embodiment, the magnetic sensing value 210, the acceleration sensing value 220, the gyro sensing value 230, the first wireless communication signal 240, and/or the second wireless communication signal 250 in the long path, which are/is included in the virtual marker 410, 420, or 430, may change depending on an indoor structure. For example, the magnetic sensing value 210, the first wireless communication signal 240, and/or the second wireless communication signal 250 may change depending on a shape of the path and/or a structure around the path. For another example, the acceleration sensing value 220 and/or the gyro sensing value 230 may change depending on a speed moving along a path and/or a direction where the electronic device 101 faces when moving along the path.

In an embodiment, when the virtual markers 410, 420, and 430 correspond to a long path, the long path may be a path having a length of about 5 m or more and about 100 m or less. The virtual marker 410 may be data corresponding to a specific movement line in the interior. For example, the virtual markers 410, 420, and 430 may be data corresponding to a movement line which starts from the first point 410 and arrives at the third point 430 through the second point 420. A user may define the virtual markers 410, 420, and 430 as data indicating a continuous progress path, such as a movement line which starts from the starting point 410 and arrives at the arrival point 430 through the path 420 in the building.

However, if the user enters the region at 430 and reverses the progress path, the coordinate system of the virtual markers may be different from the coordinate system of the virtual markers that were defined when proceeding from 410 to 430.

Virtual Marker Platform

Figure 5:
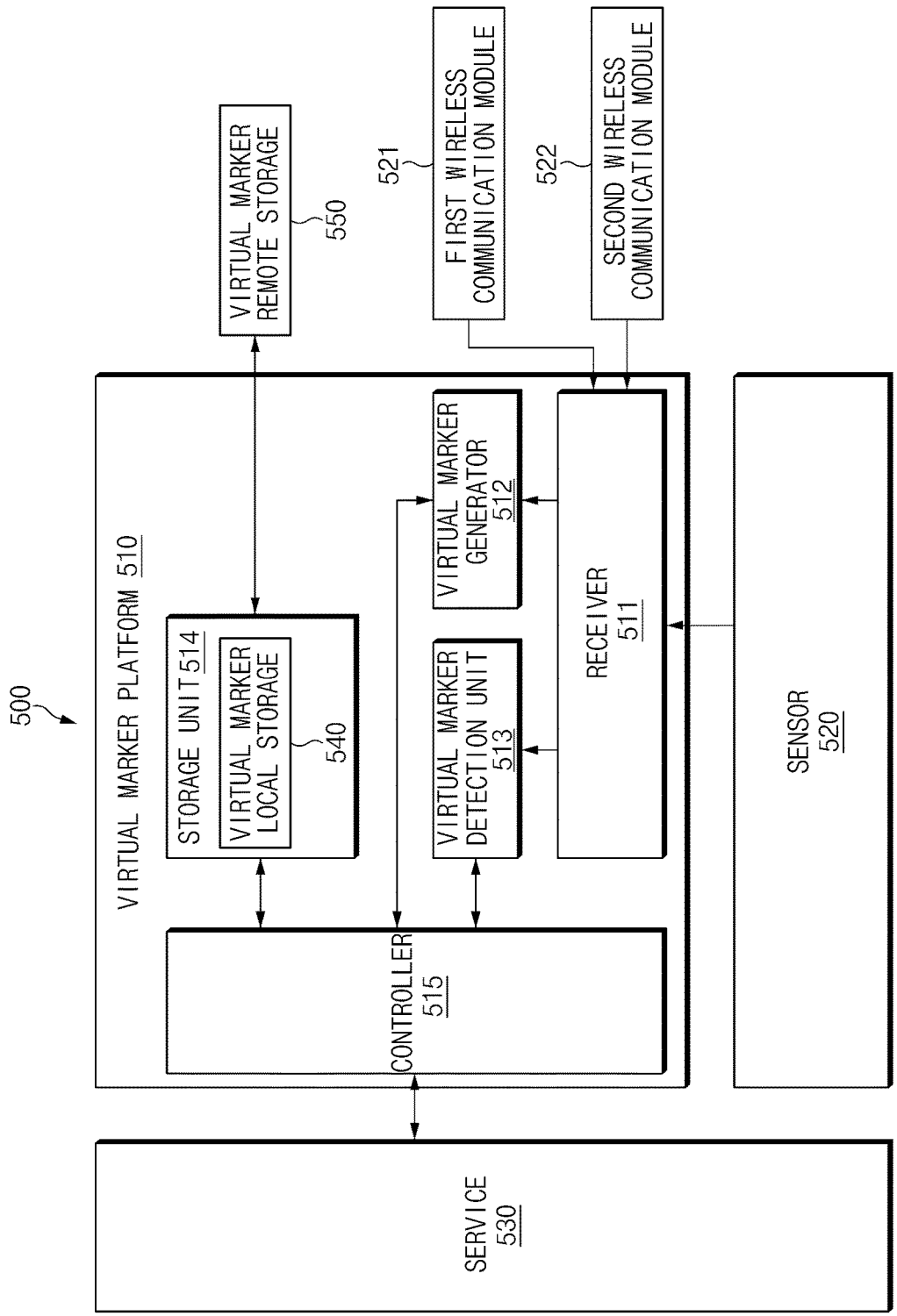
FIG. 5 is a block diagram illustrating a virtual marker platform according to an embodiment.

FIG. 5 is a block diagram 500 illustrating a virtual marker platform 510 according to an embodiment. The virtual marker platform 510 may be software stored in a memory (e.g., a memory 130 of FIG. 1). The virtual marker platform 510 may include one or more instructions. A processor (e.g., a processor 120 of FIG. 1) may load and execute the virtual marker platform 510 from the memory 130. The virtual marker platform 510 according to an embodiment may include a receiver 511, a virtual marker generator 512, a virtual marker detection unit 513, a storage unit 514, and a controller 515.

In an embodiment, the receiver 511 may receive sensing data from a sensor 520. The sensing data may include a magnetic signal, movement of an electronic device (e.g., an electronic device 101 of FIG. 1), acceleration of the electronic device 101, and/or an angle orientation formed with the ground by the electronic device 101. The sensor 520 may provide the magnetic sensing values 210, acceleration sensing values 220, and the gyro sensing values 230.

In an embodiment, the receiver 511 may receive first wireless communication data or second wireless communication data. The first wireless communication data may include a wireless LAN signal (e.g., a first wireless communication signal 240 of FIG. 2) and related parameters. The second wireless communication data may include a cellular signal (e.g., a second wireless communication signal 250 of FIG. 2) and related parameters.

In an embodiment, the receiver 511 may collect and provide sensing data to the virtual marker generator 512 and/or the virtual marker detection unit 513. The receiver 511 may collect data from the sensor 520 including a magnetic field sensor, an accelerometer, and/or a gyroscope.

In an embodiment, the receiver 511 may correct sensing data using motion information of the electronic device 101 to be used to generate and/or detect a virtual marker (e.g., a one-dimensional marker 201 of FIG. 2). The receiver 511 may generate information such as an orientation and/or a posture of the electronic device 101 from sensing data collected to provide essential information and/or efficient information about generating and/or detecting the virtual marker 201 and may provide the information to the virtual marker generator 512 and/or the virtual marker detection unit 513.

In an embodiment, the virtual marker generator 512 may generate the first virtual marker 201 corresponding to a first location which is a current location of the electronic device 101 using the sensing data. The virtual marker generator 512 may receive a request to generate the virtual marker 201 from the controller 515. The virtual marker generator 512 may generate the first virtual marker depending on a specified format based on the sensing data, such as magnetic field information, movement information of the electronic device 101, and/or an image of the camera 180 supporting augmented reality, which are/is provided from the receiver 511. The virtual marker generator 512 may generate the first virtual marker depending on the specified format based on the first wireless communication data and the second wireless communication data, which are provided from the receiver 511. The virtual marker generator 512 may request the controller 515 to register the generated virtual marker 201.

In an embodiment, the virtual marker detection unit 513 may detect any virtual marker. The virtual marker detection unit 513 may detect the virtual marker 201 corresponding to the virtual marker 201 requested from the controller 515. When the virtual marker 201 requested from the controller 515 is detected, the virtual marker detection unit 513 may deliver a result associated with the detected virtual marker 201 to the controller 515.

In an embodiment, the storage unit 514 may store the first virtual marker 201. The storage unit 514 may include virtual marker local storage 540. The virtual marker local storage 540 may be a partial physical and logical area of the memory 130. For example, the virtual marker local storage 540 may be a partial area of the memory, which is physically allocated, or may be defined as a logical memory address value. Virtual marker remote storage 550 may be a server (e.g., a server 103 of FIG. 1) outside the electronic device 101.

In an embodiment, the controller 515 may request the virtual marker local storage 540 and/or the virtual marker remote storage 550 to register the virtual marker, thus registering the virtual marker 201. The controller 515 may transmit a request to load a virtual marker list and/or a virtual marker, which are/is stored in the virtual marker local storage 540 and the virtual marker remote storage 550, and may load the stored virtual marker list and/or the stored virtual marker.

In an embodiment, the controller 515 may register a first virtual marker, may detect any virtual marker, and may load the first virtual marker 201 from the storage unit 514. The controller 515 may control signals and/or pieces of information transmitted and received in the virtual marker platform 510.

In an embodiment, the service 530 may be a function associated with detecting the virtual marker 201 in the electronic device 101. The service 530 may be an application (e.g., an application 146 of FIG. 1) run in a location where the virtual marker 510 is detected or a function (or an operation) provided by the application 146. For example, the service 530 may be a gym app configured to be run in a gym entrance where the electronic device 101 detects the virtual marker 510. The service 530 may be a notification for providing an event which occurs in a location where the virtual marker 201 is detected. For example, the service 530 may provide a push notification that the electronic device 101 enters an entrance to a supermarket. The service 530 may be a function of changing or authenticating an operation of the application 146 as the virtual marker 201 is detected. For example, the service 530 may change a payment app to a payment ready state when the electronic device 101 enters a counter and may provide an indication guiding a user to perform authentication.

In an embodiment, the controller 515 may provide the service 530 mapped to a location where the virtual marker 201 is detected. For example, when detecting that the electronic device 101 enters a location where the virtual marker 201 is generated, the controller 515 may execute the service 530. For another example, when detecting that the electronic device 101 enters the location where the virtual marker 201 is generated, the controller 515 may transmit a control signal requesting to execute a specified event to the service 530

In an embodiment, the virtual marker platform 510 may not include at least one of the components shown in FIG. 5, may include another component which is not shown, or may include a component into which a plurality of components are merged. For example, the storage unit 514 may be a component independent of the virtual marker platform 510.

Figure 6:
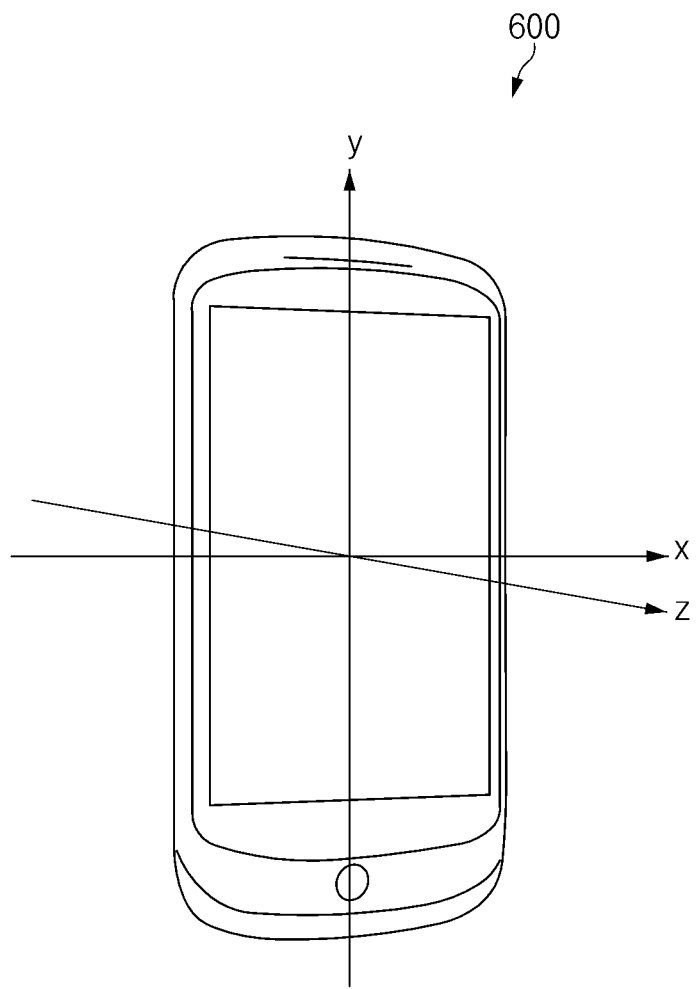
FIG. 6 is a drawing illustrating coordinates specifying a location and/or an orientation of an electronic device according to an embodiment.

FIG. 6 is a drawing illustrating coordinates (x, y, z) specifying a location and/or an orientation of an electronic device (e.g., an electronic device 101 of FIG. 1) according to an embodiment. The coordinates (x, y, z) according to an embodiment may include a first coordinate value x, a second coordinate value y, and a third coordinate value z. The first coordinate value x may be a coordinate value in the direction of a width of the electronic device (the shorter dimension along the display). The second coordinate value y may be a coordinate value in the direction of a length of the electronic device (the longer dimension along the display). The third coordinate value z may be a coordinate value in the direction of a thickness and/or a height of the electronic device (the dimension that is orthogonal to the display).

In an embodiment, a one-dimensional virtual marker (e.g., a one-dimensional virtual marker 201 of FIG. 2) may be defined as movement line data for a specified path. The virtual marker 201 of FIG. 2 may additionally include a latitude value (e.g., a latitude value 260 of FIG. 2) and/or a longitude value (e.g., a longitude value 270 of FIG. 2) corresponding to a timestamp. The movement line data may include the latitude value 260 and/or the longitude value 270 of the electronic device 101. The latitude and/or the longitude of the electronic device 101 may be measured using a global positioning system (GPS) included in a sensing module 176 of the electronic device 101 or a wireless communication module 192. A processor (e.g., a processor 120 of FIG. 1) of the electronic device 101 may identify whether the electronic device 101 is coarsely close to a specific place in the interior where the electronic device 101 is located, based on the latitude value 260 and/or the longitude value 270.

In an embodiment, the processor 120 of the electronic device 101 may determine coordinates (x, y, z) specifying a location and/or an orientation of the electronic device 101 with respect to the first coordinate value x in the direction of a width of the electronic device 101, the second coordinate value y in the direction of a length of the electronic device 101, and the third coordinate value z in the direction of a thickness and/or a height of the electronic device 101. The movement line data may include a magnetic field vector value measured based on the coordinates (x, y, z). The movement line data may include an acceleration vector value and/or an angular acceleration vector value measured based on the coordinates (x, y, z) specifying the location and/or the orientation of the electronic device 101. The movement line data may include air pressure and/or altitude values measured based on the coordinates (x, y, z) specifying the location of the electronic device 101.

In an embodiment, the movement line data may include parameter values for a cellular signal measured and/or received based on the coordinates (x, y, z) specifying the location and/or the orientation of the electronic device 101. The movement line data may include parameter values for a wireless LAN signal measured and/or received based on the coordinates (x, y, z) specifying the location and/or the orientation of the electronic device 101. The movement line data may include parameter values for a Bluetooth signal measured and/or received based on the coordinates (x, y, z) specifying the location and/or the orientation of the electronic device 101.

Figure 7:
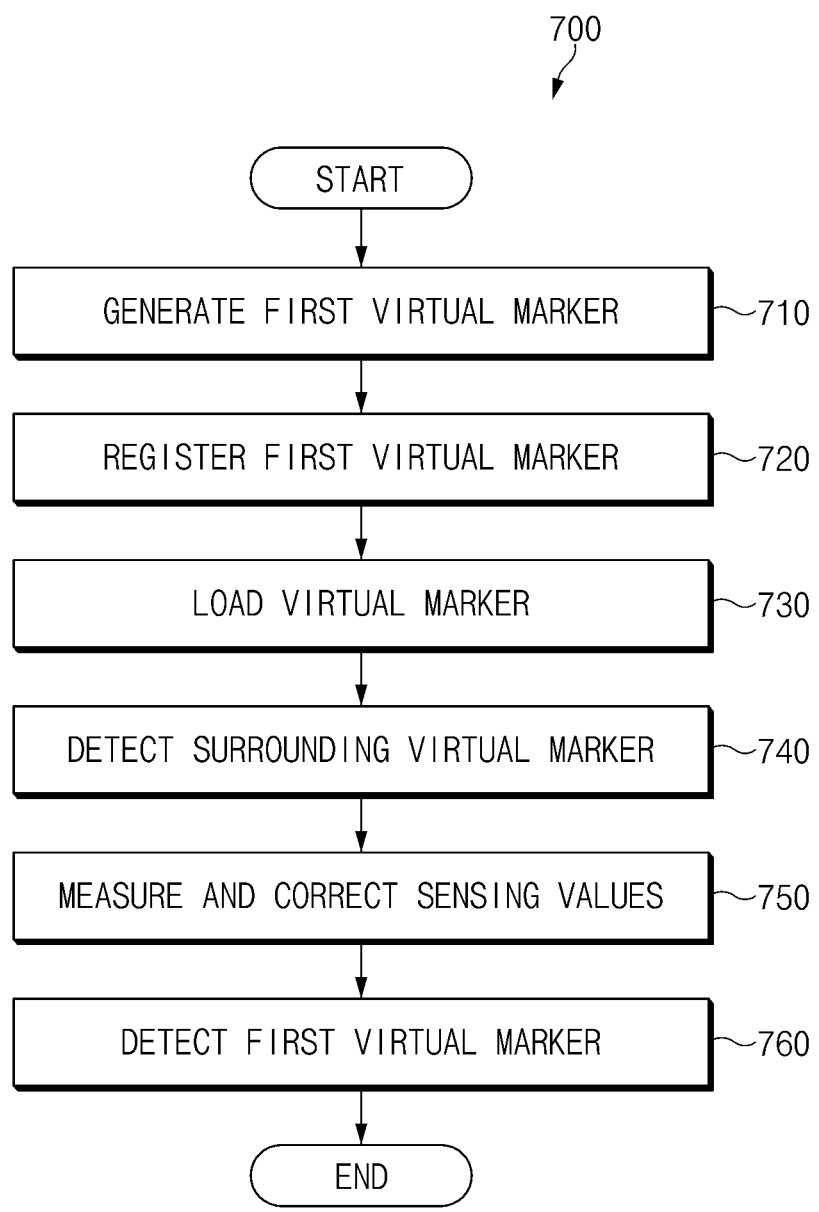
FIG. 7 is a flowchart illustrating an operation of generating and/or detecting a virtual marker according to an embodiment.

FIG. 7 is a flowchart 700 illustrating an operation of generating and/or detecting a virtual marker 201 according to an embodiment.

In an embodiment, a processor 120 of an electronic device (e.g., an electronic device 101 of FIG. 1) may perform an operation (710) of generating a virtual marker. The processor 120 may generate a first virtual marker (e.g., the virtual marker 201 of FIG. 2) corresponding to a first location. The first location may be a current location of the electronic device 101 using sensing data including a magnetic signal, movement of the electronic device 101. The first virtual marker may be generated by using acceleration of the electronic device 101, and/or an angle orientation formed with the ground by the electronic device 101 and a wireless signal received by the electronic device 101.

In an embodiment, the processor 120 may determine a radius of a specific space to be generated when generating the virtual marker 201. The processor 120 may collect sensing values and wireless signal values (e.g., sensing values 210, 220, 230, 240, and 250) within the radius through movement of the electronic device 101 within the corresponding radius using a sensor module 176.

The processor 120 may process an image obtained using a camera (e.g., a camera module 180 of FIG. 1) supporting augmented reality. The image may be processed for spatial matching between the determined space and the measured sensing values and wireless signal values 210, 220, 230, 240, and 250. This allows estimating the first location which is the current location of the electronic device 101. The electronic device 101 may identify a feature from the image obtained using the camera 180. In other words, the processor 120 of the electronic device 101 may recognize a feature point (e.g., characteristic places (the front of the mirror 310, a stair 320, or a front of a door 330) of FIG. 3, a pattern of the bottom, locations and shapes of pieces of arranged furniture, the bend of the wall, or the like) in an image by means of the camera 180 at the same time as measuring a sensing value when generating the virtual marker.

The processor 120 may perform processing for specifying any reference point on the image obtained by the camera 180. The processor 120 may estimate how far the electronic device 101 has moved with respect to the reference point. The processor 120 may estimate a movement line where the electronic device 101 moves from any one point to another point in the interior (e.g., a movement line where the electronic device 101 starts from a starting point 410 of FIG. 4 and arrives at an arrival point 430 through a path 420 in a building). The processor 120 may measure a movement degree every specified period. The processor 120 may align sensing values associated with the measured movement degree on a space.

In an embodiment, the processor 120 of the electronic device 101 may perform an operation (720) of registering a virtual marker. The processor 120 may store the first virtual marker in a memory (e.g., a memory 130 of FIG. 1). The first virtual marker stored in the memory 130 may be registered with a virtual marker list in the memory 130.

In an embodiment, the processor 120 of the electronic device 101 may perform an operation (730) of loading the virtual marker. After generating the virtual marker 201, the processor 120 may store the virtual marker 201 in the memory 130 and may register the virtual marker 201 with the virtual marker list. The processor 120 may load the virtual marker 201 to detect the registered virtual marker 201. For example, the processor 120 may load the virtual marker 201 when an application (e.g., an application 146 of FIG. 1) running an event corresponding to the registered virtual marker 201 is run in the electronic device 101. For another example, when identifying that the electronic device 101 enters a location corresponding to the registered virtual marker 201 within a certain radius, the processor 120 may load the virtual marker 201. For another example, the processor 120 may load a virtual marker to be detected among virtual markers registered with the virtual marker list from the memory 130, when receiving a notification associated with a service associated with a location where the virtual marker 201 is registered.

In an embodiment, the processor 120 of the electronic device 101 may perform an operation (740) of detecting a surrounding virtual marker. After registering the virtual marker to be detected, the processor 120 may identify whether the electronic device 101 enters within a certain radius from the first location to identify whether it enters the first location.

In an embodiment, the processor 120 may use wireless communication, such as a cellular signal and/or a WiFi signal, which are/is able to be always received to identify whether the electronic device 101 enters within the certain radius from the virtual marker 201 and do/does not separately consume power for transmission and reception. The processor 120 may detect whether the electronic device 101 enters within the certain radius from the first location from a relatively wide radius using wireless communication circuitry 192. When it is identified that the electronic device 101 enters within the certain radius from the first location, the processor 120 may operate at least some of sensors of the sensor module 176 used when generating the virtual marker 201. For example, when the electronic device 101 enters within the certain radius from the first location, the processor 120 may operate sensors necessary for detection of the first virtual marker among the sensors of the sensor module 176.

In an embodiment, the processor 120 of the electronic device 101 may perform an operation (750) of processing a sensing value. The processor 120 may organize sensing values 210, 220, 230, 240, and 250 measured using the sensor module 176 in the certain radius into data.

In an embodiment, the processor 120 may correct errors of the sensing values 210, 220, 230, 240, and 250, which occur due to movement of the electronic device 101. To correct the errors of the sensing values 210, 220, 230, 240, and 250 changed due to the motion of the electronic device, the processor 120 may align and compare information included when generating the virtual marker 201 and a coordinate axis of information measured when detecting the virtual marker 201.

In an embodiment, the processor 120 of the electronic device 101 may perform an operation (760) of detecting a virtual marker. The processor 120 may compare the measured sensing values with sensing data of the first virtual marker to identify whether the electronic device 101 enters the first location. The processor 120 may compare the sensing values 210, 220, 230, 240, and 250 corrected after being measured in real time with sensing data of the registered virtual marker 201 and may provide a specified service when they are identical to each other. For example when the sensing data corrected after being measured in real time and the wireless signal data are matched with the first virtual marker, the processor 120 may be configured to execute an event specified to be performed in the first location by the electronic device 101 or request a service specified to be performed in the first location by the electronic device 101.

In an embodiment, operations 710 to 760 may not be generated and performed successively or in stages. For example, the process of generating and registering the virtual marker 201 in operations 710 and 720 and the sensing operation in operation 740 may be separately performed.

Figure 8:
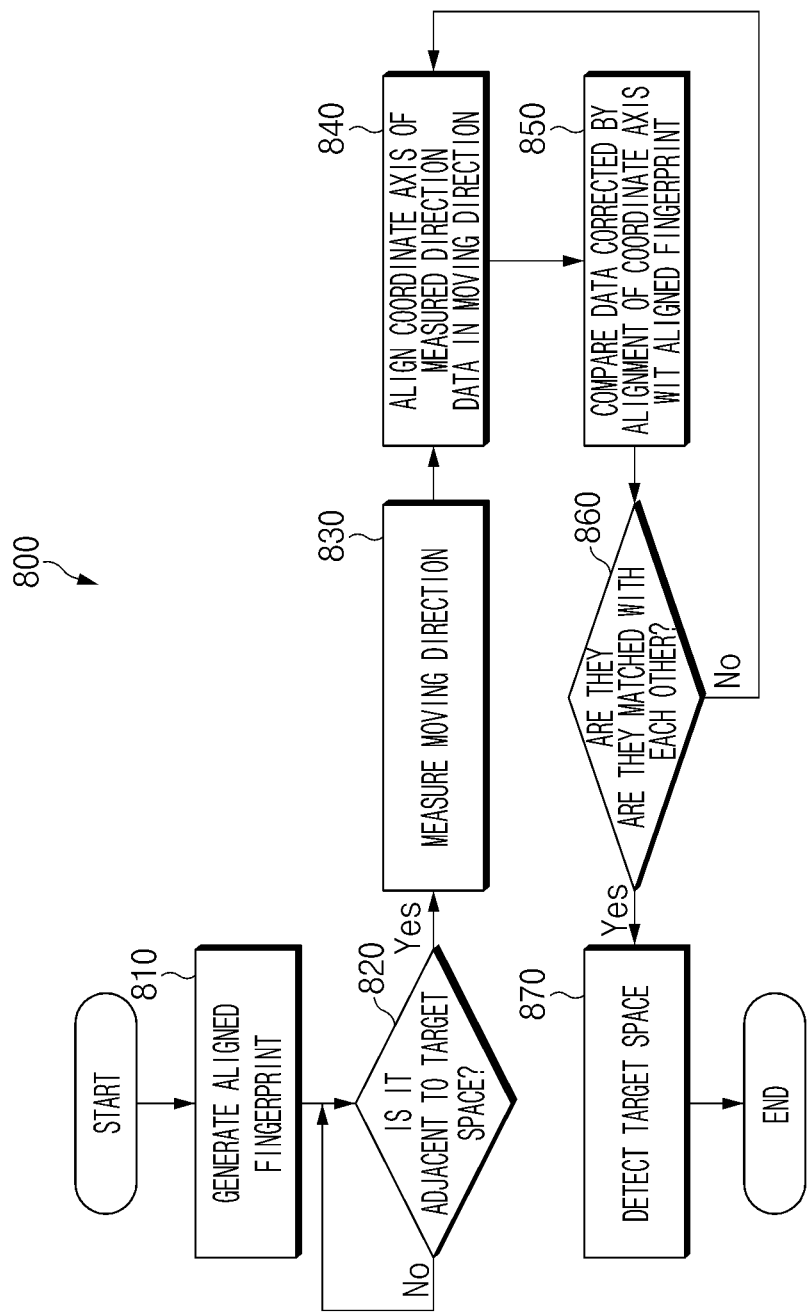
FIG. 8 is a flowchart illustrating a procedure of registering and detecting a space based on a moving direction of an electronic device according to an embodiment.

FIG. 8 is a flowchart 800 illustrating a procedure of registering and detecting a space based on a moving direction of an electronic device (e.g., an electronic device 101 of FIG. 1) according to an embodiment.

In operation 810, a processor (e.g., a processor 120 of FIG. 1) of the electronic device 101 according to an embodiment may generate an aligned fingerprint. The fingerprint may be data defining a specific space, for example a virtual marker (e.g., a one-dimensional virtual marker 201 of FIG. 2). The aligned fingerprint may be data obtained by aligning and correcting coordinate axes of pieces of sensing data having directionality with respect to one coordinate axis. The processor 120 may store the aligned fingerprint in a memory 130 of the electronic device 101 or may transmit the aligned fingerprint to a server 108.

In operation 820, the processor 120 of the electronic device 101 according to an embodiment may determine whether the electronic device 101 is adjacent to a target space. The processor 120 may compare the aligned fingerprint with location data associated with the target space. When the aligned fingerprint has a correlation of a specified correlation or more with the location data associated with the target space, the processor 120 may determine that the electronic device 101 is adjacent to the target space. The target space may be a space where the electronic device 101 is located when the fingerprint including data measured on the corresponding region is stored in the electronic device 101. When the electronic device 101 is adjacent to the target space (operation 820: Yes), the processor 120 may proceed with operation 830. When the electronic device 101 is spaced apart from the target space over a specified distance (operation 820: No), the processor 120 may wait until the electronic device 101 is adjacent to the target space. The processor 120 may compare the aligned fingerprint with location data associated with the target space. When the aligned fingerprint has a correlation of the specified correlation or less with the location data associated with the target space, the processor 120 may determine that the electronic device 101 is spaced apart from the target space over the specified distance.

In an embodiment, the registration of the space and the detection of the registered space may not be continuous operations. Thus, operation 810 and operation 820 may not occur sequentially. Furthermore, when there is a fingerprint previously stored in the electronic device 101 or a server 108, the electronic device 101 may perform the operation from operation 820.

In operation 830, the processor 120 of the electronic device 101 according to an embodiment may measure a moving direction. The processor 120 may measure a direction where the electronic device 101 is moved using a sensor (e.g., an accelerometer or a gyroscope).

In operation 840, the processor 120 of the electronic device 101 according to an embodiment may align a coordinate axis of the measured direction data with respect to the moving direction. The processor 120 may measure pieces of data (e.g., a magnetic field value, an acceleration value, and a gyro value) having directionality such that the electronic device 101 detects the target space. The processor 120 may align directions of pieces of measurement data having directionality on a coordinate axis with respect to a direction where the electronic device 101 is moved to correct the pieces of data.

In operation 850, the processor 120 of the electronic device 101 according to an embodiment may compare the data corrected by aligning the coordinate axis with the aligned fingerprint. The processor 120 may compare the pieces of measurement data corrected such that the direction is aligned with respect to the coordinate axis with the stored fingerprint.

In operation 860, the processor 120 of the electronic device 101 according to an embodiment may determine whether the corrected data and the fingerprint in which coordinate axes of all data are aligned are matched with each other. The processor 120 may determine whether the pieces of measurement data corrected by aligning the coordinate axis have a correlation of a specified value or more with the stored fingerprint. When the pieces of measurement data have the correlation of the specified value or more with the stored fingerprint, the processor 120 may determine whether the data, the coordinate axis of which is aligned, and the fingerprint, the coordinate axis of which is aligned, are matched with each other. When the aligned data and the aligned fingerprint are matched with each other (operation 850: Yes), the processor 120 may proceed with operation 870. When the aligned data and the aligned fingerprint are different from each other (operation 850: No), the processor 120 may return to operation 840.

In operation 870, the processor 120 of the electronic device 101 according to an embodiment may detect a target space. The processor 120 of the electronic device 101 may identify that the electronic device 101 enters a space where the virtual marker is set.

In the operation of comparing the measurement data corrected by aligning the coordinate axis with the fingerprint corrected by aligning the coordinate axis in operation 850, coordinate axes of values including a direction component among values included in the measurement data may be aligned in a certain direction. The processor 120 may estimate a moving direction of the electronic device 101 to be compared with the fingerprint, the coordinate axis of which is aligned. The processor 120 may align a coordinate axis of the measurement data in a direction corresponding to the moving direction of the electronic device 101. The processor 120 may align the coordinate axis of the corrected measurement data again in a direction corresponding to the coordinate axis of the fingerprint.

Figure 9:
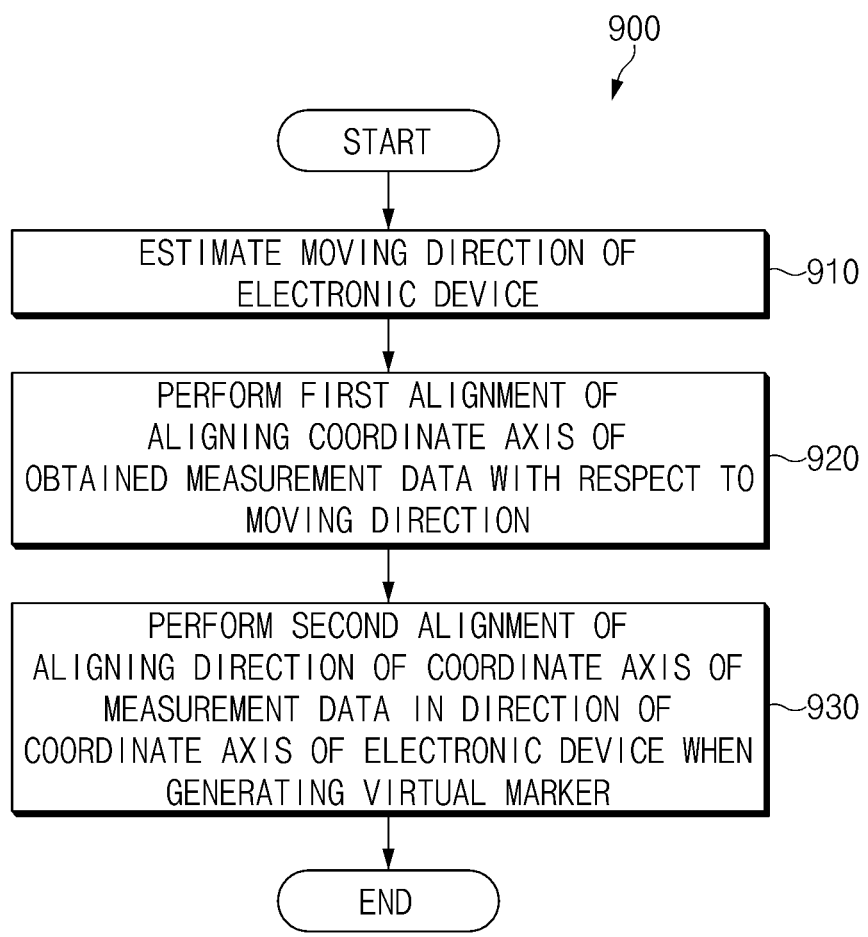
FIG. 9 is a flowchart illustrating a method for detecting entry of an electronic device into a specific region according to an embodiment.

In an embodiment, the processor 120 may apply certain embodiments described in FIG. 9 or less for the operation of processing the sensing values 210, 220, 230, 240, and 250 and determining whether it enters the corresponding location in operation 750 and/or the operation of comparing the measurement data, the coordinate axis of which is aligned, with the fingerprint, the coordinate axis of which is aligned, in operation 850.

FIG. 9 is a flowchart 900 illustrating a method for detecting entry of an electronic device (e.g., an electronic device 101 of FIG. 1) into a specific region according to an embodiment.

In operation 910, a processor 120 of the electronic device 101 according to an embodiment may estimate a moving direction of the electronic device 101. When detecting that the electronic device 101 is moved, the processor 120 may estimate a moving direction of the electronic device 101 with respect to a coordinate axis (e.g., coordinates (x, y, z) of FIG. 6) of the electronic device 101. When detecting that the electronic device 101 is moved, the processor 120 may estimate a moving direction on the coordinate axis (x, y, z) of the electronic device 101.

In an embodiment, the processor 120 may estimate a moving direction of the electronic device 101 using a sensor (e.g., a sensor included in a sensor module 176 of FIG. 1) and/or communication circuitry (e.g., a wireless communication module 192 of FIG. 1). For example, the processor 120 may determine a progress direction of the electronic device 101 based on an acceleration value of the electronic device 101 and/or an orientation of the electronic device 101, which are/is measured by an accelerometer and/or a gyroscope included in the sensor module 176. For another example, the processor 120 may determine the progress direction the electronic device 101 based on a WiFi signal and/or a cellular signal received by the communication circuitry 192.

In operation 920, the processor 120 of the electronic device 101 according to an embodiment may perform first alignment of aligning a direction of measurement data, obtained to determine whether the electronic device 101 enters a first region where a virtual marker is registered, in the moving direction. The processor 120 may correct measurement data obtained to detect a space or an object after estimating the orientation of the electronic device 101 based on the moving direction of the electronic device 101. The processor 120 may align a direction of any coordinate axis of data corresponding to a vector value having a direction component among the measurement data to be substantially the same as a direction where the electronic device 101 progresses.

In operation 930, the processor 120 of the electronic device 101 according to an embodiment may perform second alignment of aligning a direction of a coordinate axis of the measurement data in the direction of a coordinate axis of the electronic device 101 when the registered virtual marker is generated. The processor 120 may compare data stored in a state where the coordinate axis is aligned in the generated virtual marker or fingerprint with the measurement data where the coordinate axis is aligned in operation 920. The processor 120 may synchronize a reference vector of the electronic device 101 or any axis among coordinate axes of the electronic device 101 with a moving direction of the electronic device 101 and may compare a vector component of the measurement data with a vector component of the virtual marker and/or the fingerprint to detect the generated virtual marker and/or fingerprint.

Figure 10:
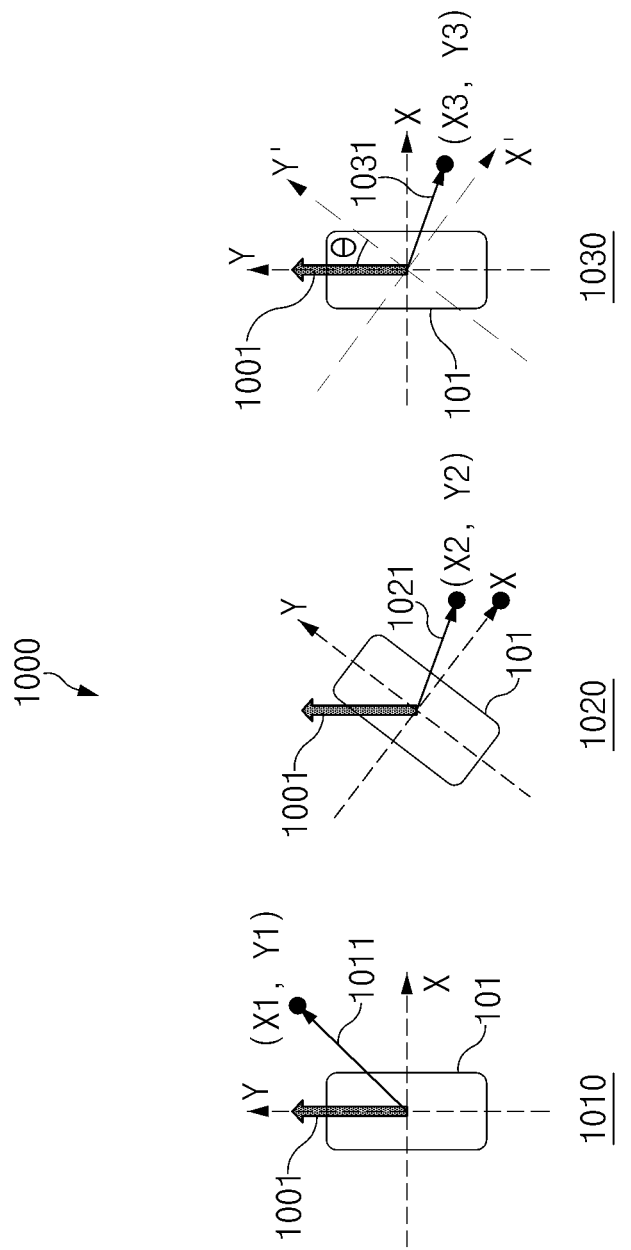
FIG. 10 is a drawing illustrating that an electronic device aligns and stores a coordinate axis of measurement data as a virtual marker in a specified direction according to an embodiment.

FIG. 10 is a drawing illustrating that an electronic device 101 aligning and storing a coordinate axis of measurement data as a virtual marker in a specified direction in memory, according to an embodiment.

A processor (e.g., a processor 120 of FIG. 1) of the electronic device 101 may set a specified first direction 1001 to a Y-axis with an X-axis orthogonal to the Y-axis. When later storing a measured magnetic field value, the processor 120 may align the measured magnetic field value in a reference direction. When a virtual marker is generated, the reference direction may be randomly determined. For example, the Y-axis may be aligned to be identical to the reference direction on a coordinate axis (e.g., coordinates (x, y, z) of FIG. 6) of the electronic device 101.

In a first situation 1010, the electronic device 101 may face the specified first direction 1001. The electronic device 101 may measure a vector value 1011 including a direction component among data included in a virtual marker. For example, when facing a first direction 1001, the electronic device 101 may represent the vector value 1011 as a coordinate value for an XY plane, with constituent X and Y vectors. In the first situation 1010, the processor 120 may measure data, such as a magnetic field value. The measured data may have directionality in a first time in a situation where the Y-axis is identical to the reference direction. The processor 120 may store the measured value as a first coordinate value (x1, y1) in the virtual marker.

In a second situation 1020, the Y-axis of the electronic device 101 (the longer planar direction) may face a direction different from the first direction 1001. In the second situation 1020, when the electronic device 101 measures a vector value having directionality in a second time, the first direction 1001 and the Y-axis of the electronic device 101 may be different from each other. The processor 120 may obtain a second coordinate value (x2, y2) which is raw data.

In a third situation 1030, the orientation of the electronic device 101 may be set to face the first direction 1001 and a vector value 1031 may be stored in the virtual marker. In the second situation 1020, the processor 120 may rotate a coordinate axis (X', Y') such that the Y-axis of the electronic device 101 is identical to the first direction 1001 That is, the coordinate system may be rotated θ degrees counterclockwise. This aligns the coordinate axis (X', Y') in a specified direction (X, Y). After rotating and changing the coordinate axis (X', Y') in the specified direction (X, Y), the processor 120 may store a third coordinate value (x3, y3), obtained by rotating the second coordinate value (x2, y2), which is raw data, by a specified angle θ, in the virtual marker.

Figure 11:
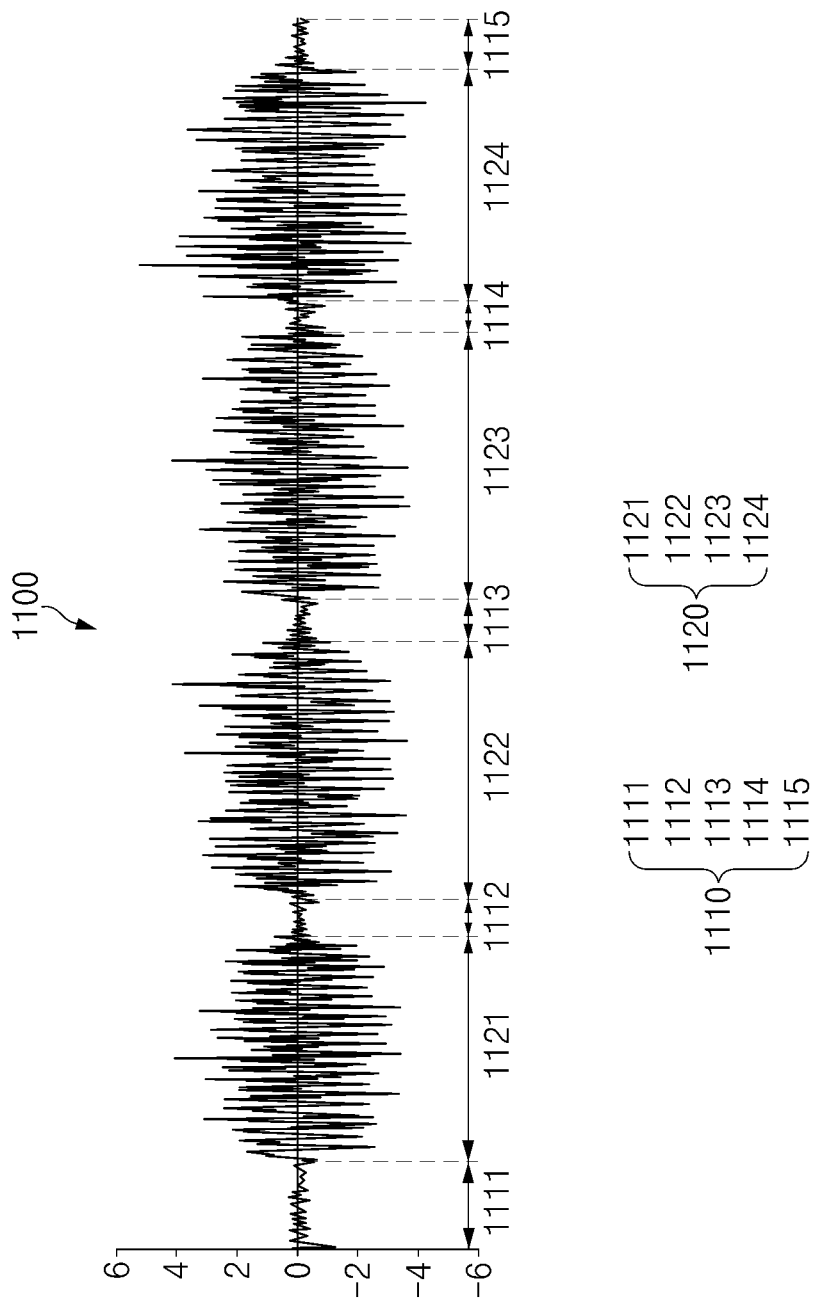
FIG. 11 is a graph illustrating a change in acceleration in the direction of gravity when a user moves with an electronic device according to an embodiment.

FIG. 11 is a graph 1100 illustrating a change in acceleration in the direction orthogonal to gravity when a user moves with an electronic device (e.g., an electronic device 101 of FIG. 1) according to an embodiment.

In an embodiment, when the user moves with the electronic device 101, a first interval 1110, which is a state where the electronic device 101 is stopped, and a second interval 1120, which is a state where the electronic device 101 is moved, may be included according to a state where the user stops walking or starts to walk. The first interval 1110 may include a plurality of first sub-intervals 1111, 1112, 1113, 1114, and 1115, and the second interval 1120 may include a plurality of second sub-intervals 1121, 1122, 1123, and 1124.

In an embodiment, an amount of change in acceleration in the direction orthogonal to gravity in the second interval may be larger than an amount of acceleration in the orthogonal to gravity in the first interval 1110. When the user walks, the amount of change in acceleration in the direction of gravity may be greater than or equal to a specified threshold.

In an embodiment, when the user moves with the electronic device 101, a processor (e.g., a processor 120 of FIG. 1) may obtain a change in acceleration in the direction orthogonal to gravity. The processor 120 may determine a start and/or end time point of an interval where he or she moves with the electronic device 101 by measuring acceleration in the direction orthogonal to gravity. The processor 120 may estimate a departure speed of the electronic device 101 with respect to a coordinate system (e.g., coordinates (x, y, z) of FIG. 6) of the electronic device 101 using a change in acceleration, which occurs when the electronic device 101 starts to move.

Figure 12:
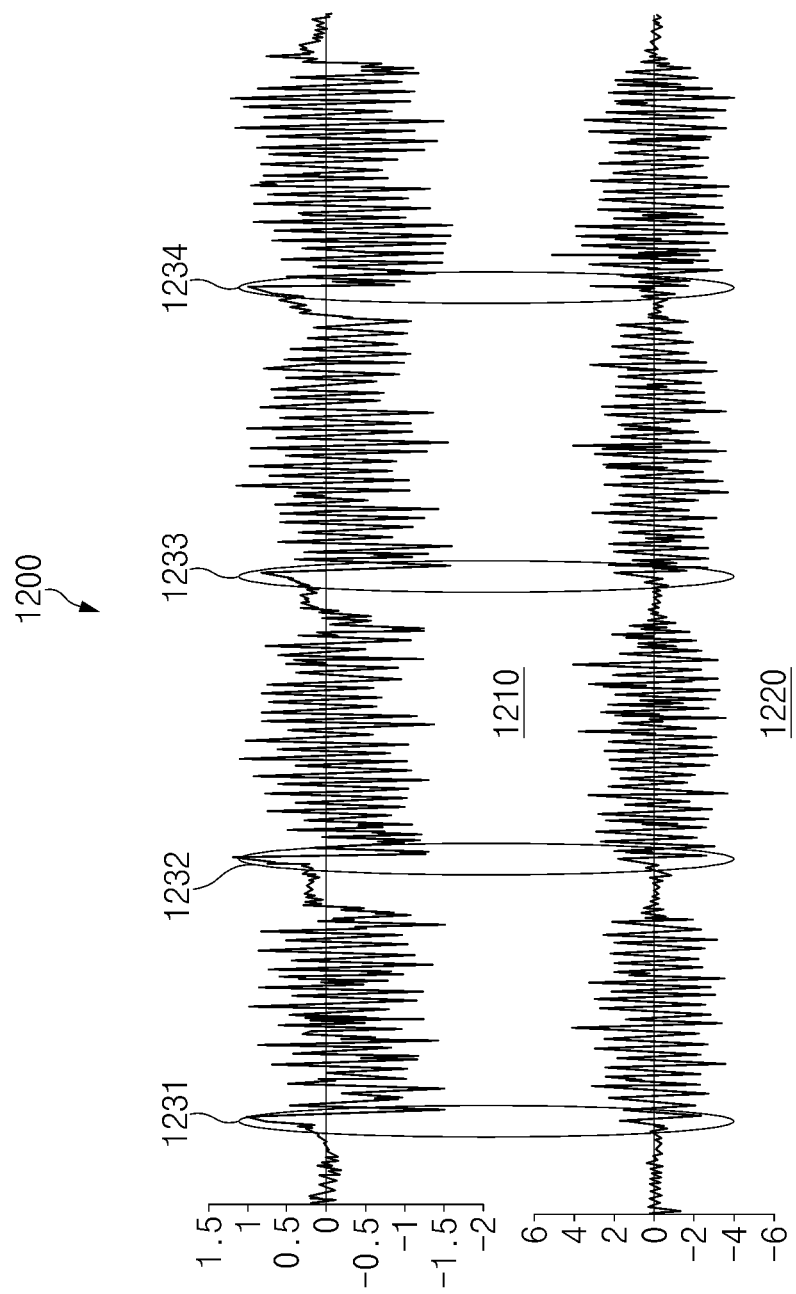
FIG. 12 is a graph illustrating acceleration in the direction of progress and the direction of gravity when a user moves with an electronic device according to an embodiment.

FIG. 12 is a graph 1200 illustrating acceleration in the direction of progress and the direction orthogonal to gravity when a user moves with an electronic device (e.g., an electronic device 101 of FIG. 1) according to an embodiment.

In an embodiment, a first graph 1210 may represent acceleration in the direction of progress, and a second graph 1220 may represent acceleration in the direction orthogonal to gravity. A processor (e.g., a processor 120 of FIG. 1) may estimate a plurality of movement start time points 1231, 1232, 1233, and 1234 based on the first graph 1210 and the second graph 1220.

In an embodiment, the processor 120 may analyze acceleration in the direction orthogonal to gravity and acceleration in the direction of progress based on the first graph 1210 and the second graph 1220. When the electronic device 101 starts to move, the processor 120 may identify that acceleration in the moving direction increases. The processor 120 may integrate the acceleration in the moving direction to estimate an initial movement speed of the electronic device 101.

Figure 13:
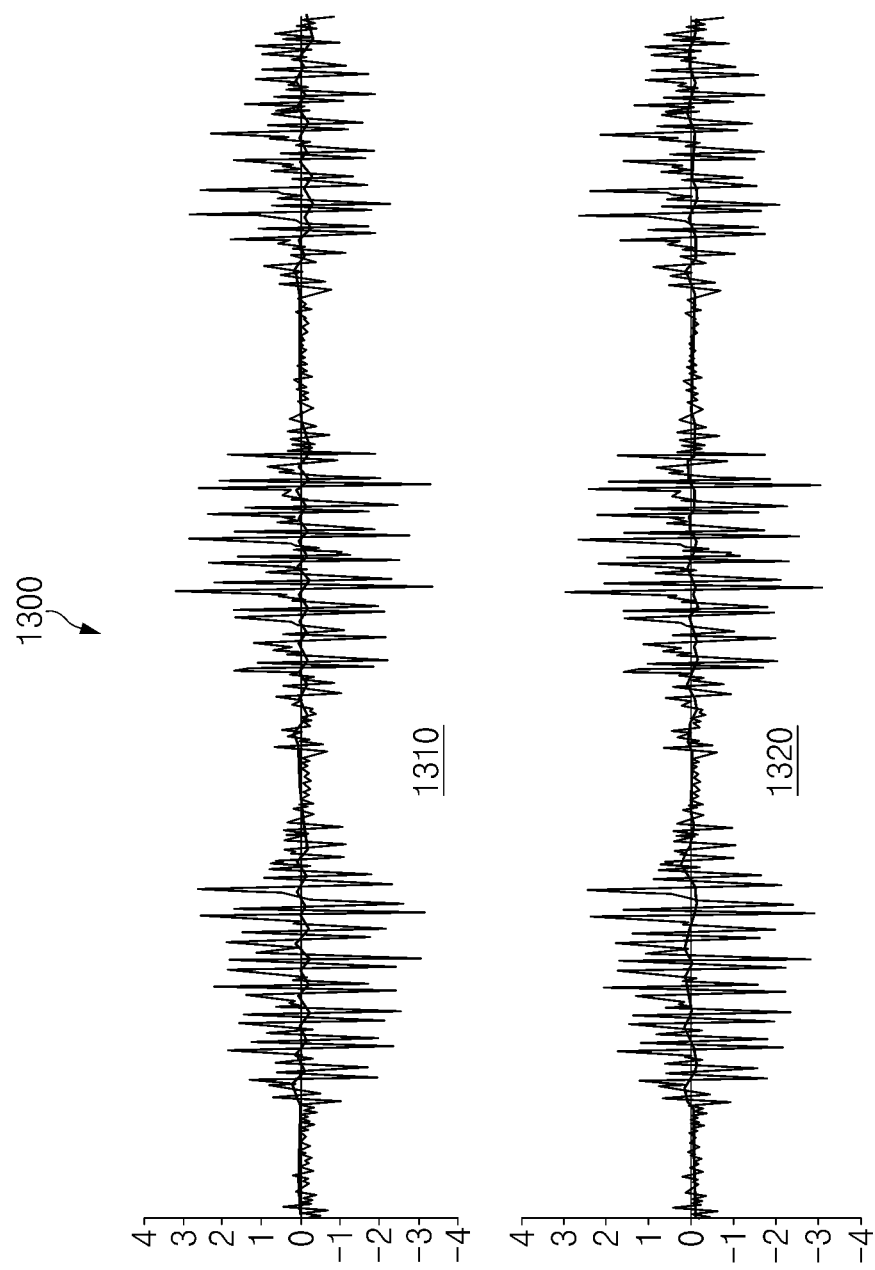
FIG. 13 is a graph illustrating acceleration which is compared with acceleration in the direction of gravity when a user moves with an electronic device and is except for acceleration in a moving direction of the electronic device according to an embodiment.

FIG. 13 is a graph illustrating acceleration which is compared with acceleration in the direction orthogonal to gravity when a user moves with an electronic device 101 and is except for acceleration in a moving direction of the electronic device 101 according to an embodiment.

In an embodiment, a third graph 1310 may represent acceleration of a moving direction of the electronic device 101, which is compared with acceleration in the direction orthogonal to gravity. In an embodiment, a fourth graph 1320 may represent acceleration except for acceleration of a moving direction of the electronic device 101, which is compared with acceleration in the direction orthogonal to gravity.

In an embodiment, a processor (e.g., a processor 120 of FIG. 1) may obtain acceleration of a moving direction of the electronic device 101 and an acceleration component except for the acceleration of the moving direction of the electronic device 101 on a plane orthogonal to gravity by being compared with acceleration in the direction orthogonal to gravity. The processor 120 may compare an amount of change in acceleration indicated in the moving direction of the electronic device 101 with an amount of change in acceleration except for the moving direction of the electronic device 101.

In an embodiment, the processor 120 may determine that the amount of change in acceleration indicated in the moving direction of the electronic device 101 has a correlation where acceleration in the direction orthogonal to gravity is higher than the amount of change in acceleration except for the moving direction of the electronic device 101. The processor 120 may estimate a direction vector, having the highest correlation with acceleration in the direction orthogonal to gravity, as the moving direction of the electronic device 101 on a plane orthogonal to the acceleration in the direction orthogonal to gravity.

In an embodiment, the processor 120 may accumulate an acceleration component of a plane orthogonal to acceleration in the direction orthogonal to gravity when the acceleration in the direction orthogonal to gravity has a value of a specified value or more and may extract acceleration in a progress direction of the electronic device 101. The processor 120 may update a direction where the electronic device 101 is moved continuously after the electronic device 101 starts to move and may determine a moving direction of the electronic device 101.

In an embodiment, when the progress direction is changed after it starts to move, the processor 120 may monitor a change in orientation of the electronic device 101. For example, the processor 120 may monitor a change in orientation of the electronic device 101 using a gyroscope sensor included in a sensor module (e.g., a sensor module 176 of FIG. 1). The processor 120 may distinguish whether a change in acceleration of the electronic device 101 at a corresponding point is due to rotation of the electronic device 101 or a change in progress direction of the electronic device 101.

Figure 14:
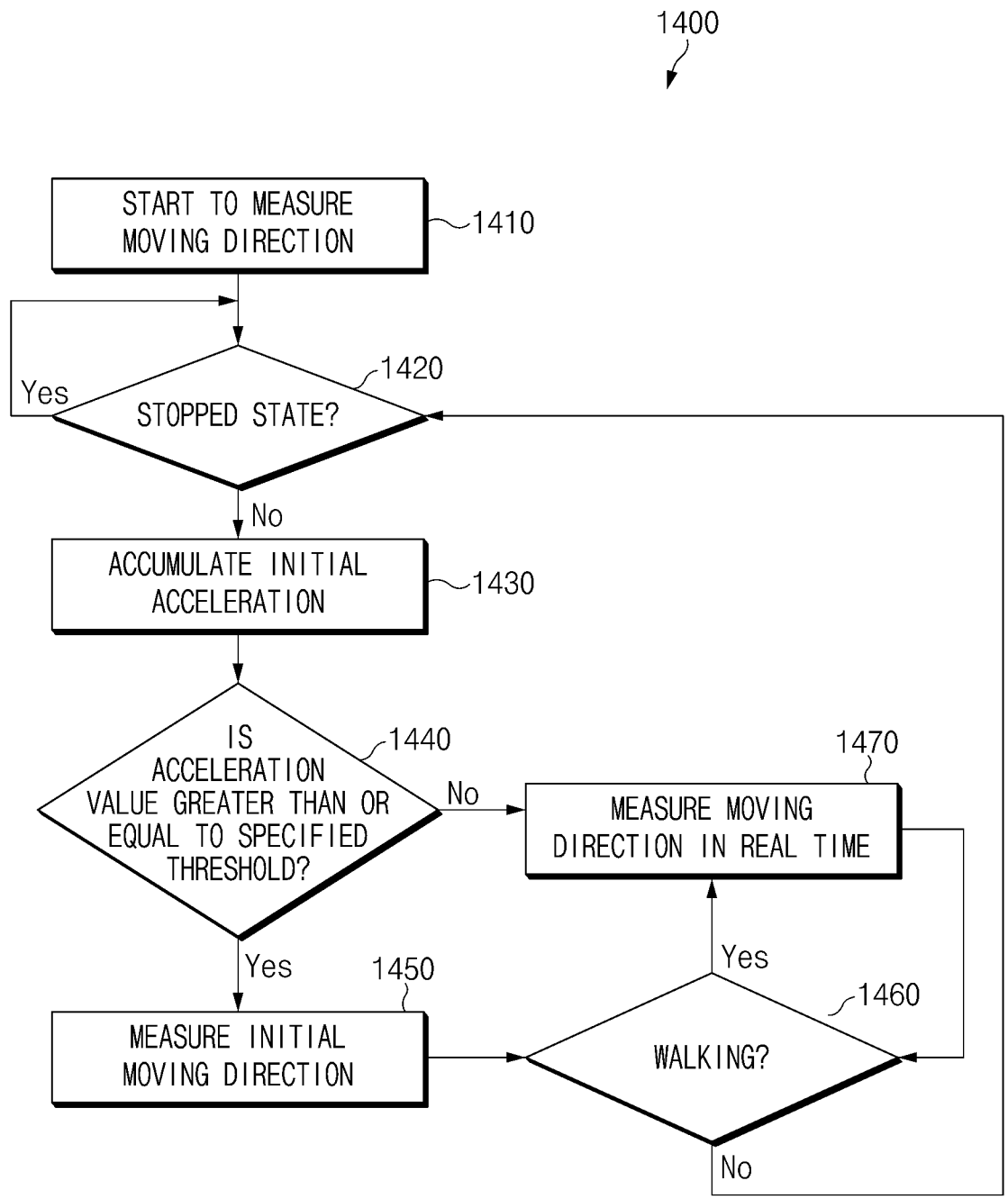
FIG. 14 is a flowchart illustrating a process of estimating a moving direction of an electronic device according to an embodiment.

FIG. 14 is a flowchart 1400 illustrating a process of estimating a moving direction of an electronic device (e.g., an electronic device 101 of FIG. 1) according to an embodiment.

In operation 1410, a processor (e.g., a processor 120 of FIG. 1) of the electronic device 101 according to an embodiment may start to measure a moving direction. When the movement of the electronic device 101 is detected, the processor 120 may turn on an accelerometer of a sensor module (e.g., a sensor module 176 of FIG. 1).

In operation 1420, the processor 120 of the electronic device 101 according to an embodiment may determine whether the electronic device 101 is stopped (0 acceleration, 0 velocity). The processor 120 may determine whether a user of the electronic device 101 stops walking using the accelerometer included in the sensor module 176. When the user of the electronic device 101 is stopped (operation 1420: Yes), the processor 120 may not proceed with a subsequent operation to maintain operation 1420. When the user of the electronic device 101 walks (operation 1420: No), the processor 120 may proceed with operation 1430.

In operation 1430, the processor 120 of the electronic device 101 according to an embodiment may accumulate initial acceleration. The processor 120 may obtain initial acceleration as the user of the electronic device 101 starts to walk using the accelerometer included in the sensor module 176. The processor 120 may accumulate initial acceleration information by accumulating a first step the user takes during a specified interval.

In operation 1440, the processor 120 of the electronic device 101 according to an embodiment may determine whether the acceleration value is greater than or equal to a specified threshold. The processor 120 may obtain an acceleration value of the electronic device 101 using the accelerometer included in the sensor module 176. When there is a change in acceleration over a specified value, the processor 120 may determine that the electronic device starts to move. When the acceleration value of the electronic device 101 is greater than or equal to the specified threshold (operation 1440: Yes), the processor 120 may proceed with operation 1450. When the acceleration value of the electronic device 101 is less than the specified threshold (operation 1440: No), the processor 120 may proceed with operation 1470.

In operation 1450, the processor 120 of the electronic device 101 according to an embodiment may measure an initial moving direction. The processor 120 may estimate an initial direction which is a direction moved where the electronic device 101 starts to move, based on the initial acceleration information. The processor 120 may obtain an initial acceleration value which is an acceleration value in an interval before a specified interval elapses. The processor 120 may estimate an initial moving direction of the electronic device 101 based on the initial acceleration value. When it is determined that the electronic device 101 starts to move, the processor 120 may obtain a departure speed of the electronic device 101 based on an acceleration value before the specified interval or after the specified interval.

In operation 1460, the processor 120 of the electronic device 101 according to an embodiment may determine whether the user is walking. The processor 120 may determine whether the user walks continuously or stops after initial movement. When the user is walking (operation 1460: Yes), the processor 120 may proceed with operation 1470. When the user is stopped (operation 1460: No), the processor 120 may return to operation 1420.

In operation 1470, the processor 120 of the electronic device 101 according to an embodiment may measure a moving direction in real time. The processor 120 may dynamically measure a moving direction to continuously estimate a direction where the electronic device 101 is moved.

In an embodiment, the processor 120 may estimate a change in speed of the electronic device 101 with respect to a coordinate system (e.g., coordinates (x, y, z) of FIG. 6) of the electronic device 101 online using a gyroscope and/or an accelerometer included in the sensor module 176. When a change in the actual direction of progress is detected using a change in acceleration when estimating the moving direction when the electronic device 101 starts or after the electronic device 101 starts, the processor 120 may separately determine a change in the direction of progress with respect to the coordinate system (x, y, z) of the electronic device 101 by means of a change in the value measured by the gyroscope.

Figure 15:
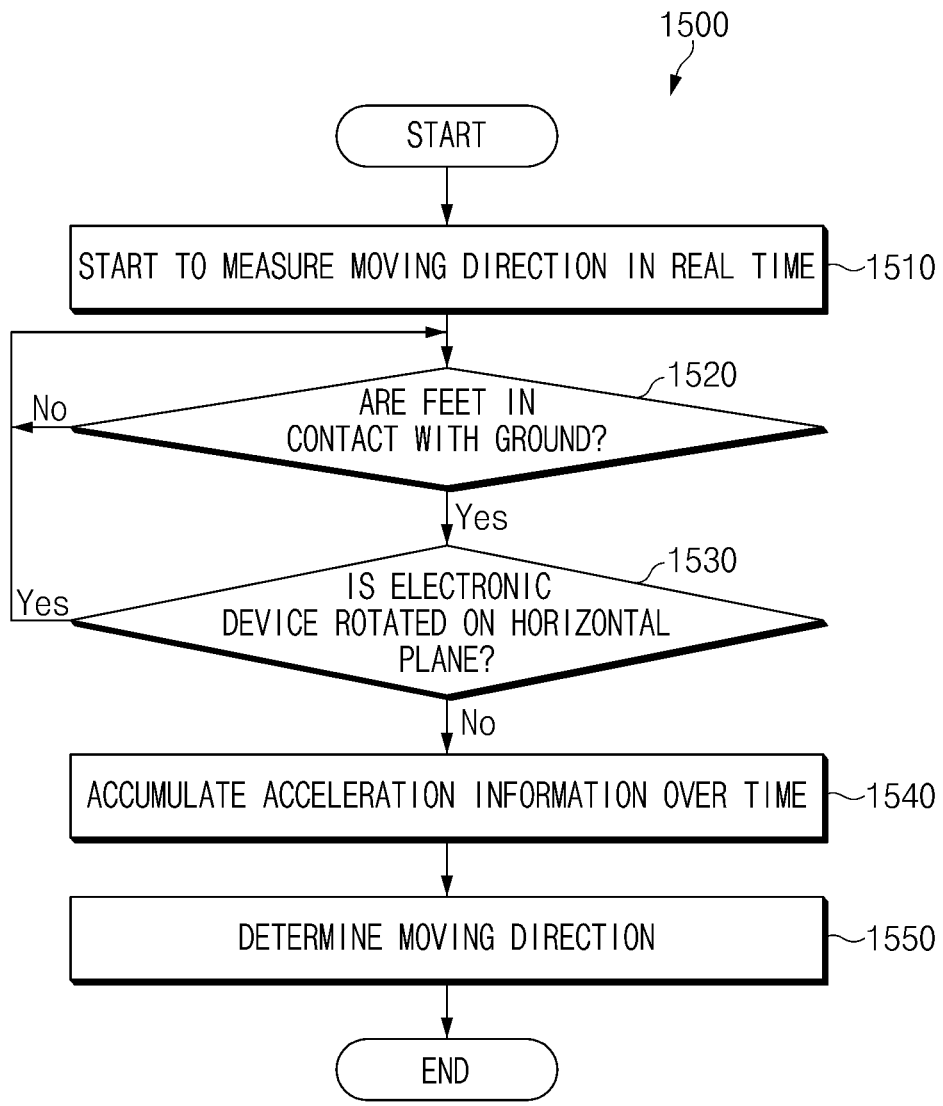
FIG. 15 is a flowchart illustrating a process of estimating a continuous moving direction of an electronic device according to an embodiment.

FIG. 15 is a flowchart 1500 illustrating a process of estimating a continuous moving direction of an electronic device (e.g., an electronic device 101 of FIG. 1) according to an embodiment.

In operation 1510, a processor (e.g., a processor 120 of FIG. 1) of the electronic device 101 according to an embodiment may start to measure a moving direction in real time, using the accelerometer. The processor 120 may start to measure the moving direction in real time to measure that the electronic device 101 is moved during an interval of a specified interval or more.

In operation 1520, the processor 120 of the electronic device 101 according to an embodiment may determine whether feet are in contact with the ground. The processor 120 may identify a time point when the feet are in contact with the ground by walking of a user. The processor 120 may determine whether a change in acceleration in the direction orthogonal to gravity is greater than or equal to a specified amount of change using an accelerometer included in a sensor module (e.g., a sensor module 176 of FIG. 1). When the feet are in contact with the ground (operation 1520: Yes), the processor 120 may proceed with operation 1530. When the feet are not in contact with the ground (operation 1520: No), the processor 120 may maintain a waiting state until the feet are in contact with the ground.

In operation 1530, the processor 120 of the electronic device 101 according to an embodiment may determine whether the electronic device 101 is rotated on a horizontal plane. The processor 120 may determine whether the electronic device 101 is rotated on a surface parallel to the ground using a 9-axis sensor included in the sensor module 176. When the electronic device 101 is rotated on the horizontal plane (operation 1530: Yes), the processor 120 may return to operation 1520. When the electronic device 101 is not rotated on the horizontal plane (operation 1530: No), the processor 120 may proceed with operation 1540.

In operation 1540, the processor 120 of the electronic device 101 according to an embodiment may accumulate acceleration information over time. The processor 120 may accumulate acceleration information according to movement of the electronic device 101 every specified period.

In operation 1550, the processor 120 of the electronic device 101 according to an embodiment may determine a moving direction. The processor 120 may determine a progress direction of the electronic device 101 based on the acceleration information over time.

Figure 16:
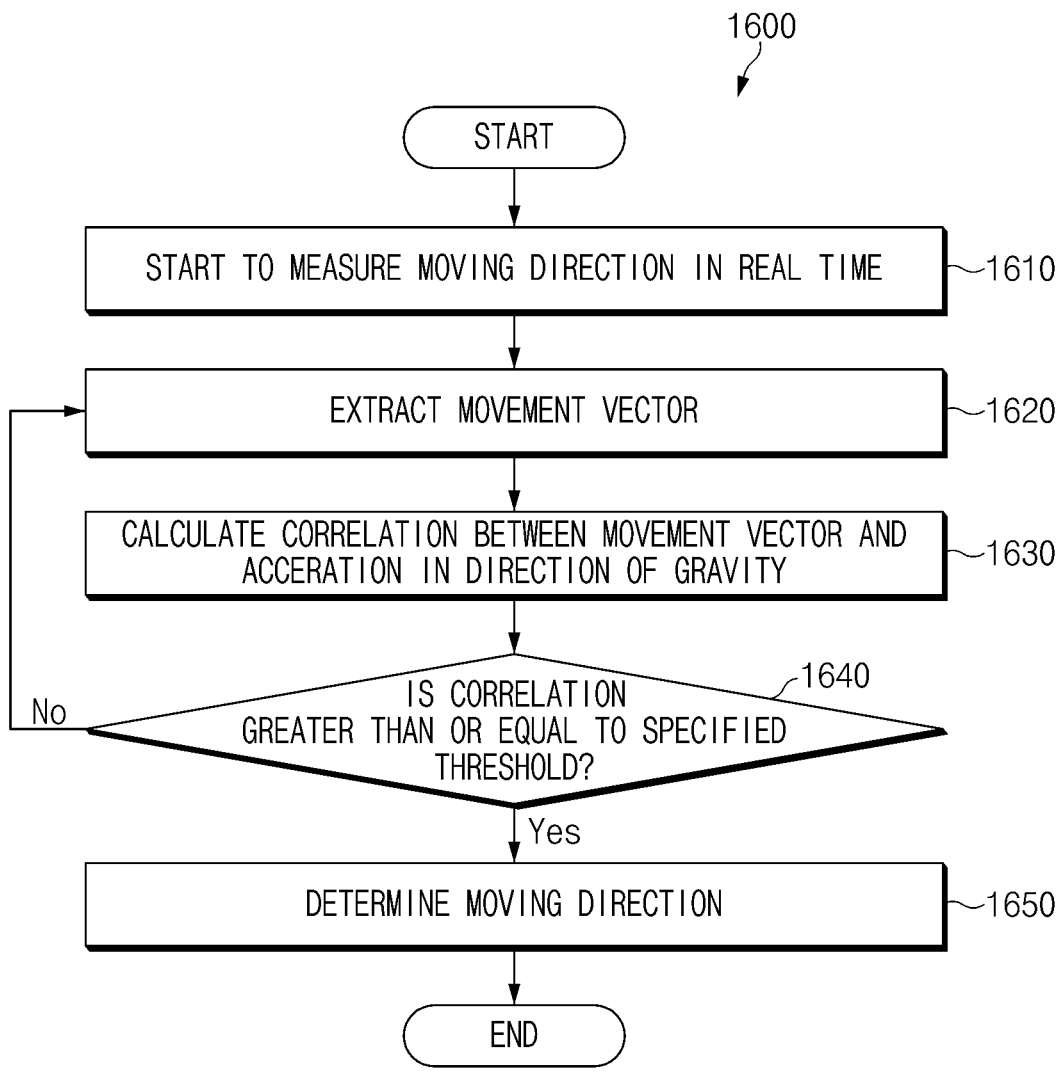
FIG. 16 is a flowchart illustrating a process of estimating a continuous moving direction of an electronic device according to another embodiment.

FIG. 16 is a flowchart 1600 illustrating a process of estimating a continuous moving direction of an electronic device (e.g., an electronic device 101 of FIG. 1) according to another embodiment.

In operation 1610, a processor (e.g., a processor 120 of FIG. 1) of the electronic device 101 according to an embodiment may start to measure a moving direction in real time. The processor 120 may start to measure the moving direction in real time to measure that the electronic device 101 is moved during an interval of a specified interval or more.

In operation 1620, the processor 120 of the electronic device 101 according to an embodiment may extract a movement vector. The processor 120 may extract a displacement and/or a trajectory where the electronic device 101 is moved during a specified time as the movement vector.

In operation 1630, the processor 120 of the electronic device 101 according to an embodiment may calculate a correlation between the movement vector and acceleration in the direction orthogonal to gravity.

In operation 1640, the processor 120 of the electronic device 101 according to an embodiment may determine whether the acceleration is greater than or equal to a specified threshold. When the correlation is greater than or equal to the specified threshold (operation 1640: Yes), the processor 120 may proceed with operation 1650. When the correlation is less than the specified threshold (operation 1640: No), the processor 120 may return to operation 1620 to extract the movement vector.

In operation 1650, the processor 120 of the electronic device 101 according to an embodiment may determine a moving direction. The processor 120 may determine the progress direction of the electronic device 101 based on the correlation between the movement vector and the acceleration in the direction orthogonal to gravity.

Figure 17:
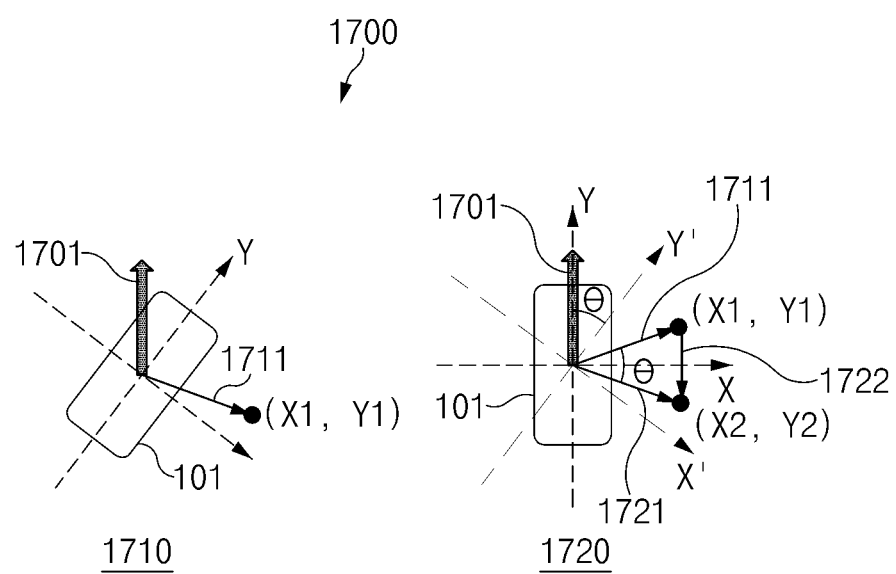
FIG. 17 is a drawing illustrating a process of changing a coordinate axis of measured data according to a change in orientation of an electronic device according to an embodiment.

FIG. 17 is a drawing 1700 illustrating a process of changing a coordinate axis of measured data according to a change in orientation of an electronic device 101 according to an embodiment. In 1710, the device is rotated theta degrees with a with respect to a first direction. Accordingly, at 1720, the axis are rotated theta degrees in the counter-clockwise direction.

In an embodiment, in a fourth situation 1710, a Y-axis of the electronic device 101 may face a direction different from a first direction 1701. A processor (e.g., a processor 120 of FIG. 1) of the electronic device 101 may generate a first direction vector 1711 which is data having directionality among pieces of data measured by the electronic device 101.

In an embodiment, in a fifth situation 1720, the Y-axis of the electronic device 101 may change to face a direction such as the first direction 1701. The processor 120 may change the first direction vector 1711 measured on a previous coordinate axis (X', Y') to correspond to a changed coordinate axis (X, Y), thus generating a second direction vector 1721. For example, the processor 120 may apply a rotation vector 1722 for changing the previous coordinate axis (X', Y') to the changed coordinate axis (X, Y) to convert the first direction vector 1711 into the second direction vector 1721.

In an embodiment, after estimating an orientation of the electronic device 101, the processor 120 may align a coordinate axis of data measured to detect a space or an object based on a moving direction of the electronic device 101. The processor 120 may perform first alignment (e.g., operation 920 of FIG. 9) to be used when detecting the corrected value. The processor 120 may align a coordinate axis of a sensor value having directionality measured when knowing a progress direction of the electronic device 101 with respect to the progress direction of the electronic device 101.

In an embodiment, the processor 120 may synchronize the progress direction of the electronic device 101 with any axis (e.g., a Y-axis) among coordinate axes of the electronic device 101. The processor 120 may align and provide the measured direction vector value to correspond to a rotated coordinate axis to a detection unit (e.g., a virtual marker detection unit 513 of FIG. 5). The processor 120 may not directly provide the detection unit 513 with the first direction vector 1711 which is an original vector and may provide the detection unit with the second direction vector 1721 which is a measurement value vector after synchronizing the Y-axis of the electronic device 101 with the progress direction of the electronic device 101.

In an embodiment, the processor 120 may provide the detection unit 513 with a vector value indicating the progress direction of the electronic device 101 and a difference between the measured vector value and the converted vector value or an angle value formed by the progress direction and the measured vector. The processor 120 may provide the detection unit 513 with a third direction vector 1722 which is a vector indicating a difference value between the first direction vector 1711 and the second direction vector 1721.

In an embodiment, the processor 120 may provide the detection unit 513 with the first direction vector 1711 and a rotational matrix of rotating a coordinate axis.

In an embodiment, the processor 120 may compare a vector value (e.g., a vector value 1031 of FIG. 10) stored in a virtual marker with the second direction vector 1721. The processor 120 may rotate the second direction vector 1721 by a difference between the first direction 1001 and the progress direction of the electronic device 101, which is a reference vector stored in the virtual marker, to detect the vector value 1031 stored in the virtual marker.

In an embodiment, the processor 120 may obtain the second direction vector 1721. In an embodiment, the processor 120 may obtain the second direction vector 1721 as one vector value. For another example, the processor 120 may obtain the first direction vector 1711 and the third direction vector 1722 which is a difference vector. For another example, the processor 120 may obtain the first direction vector 1711 and a conversion angle on a coordinate axis. For another example, the processor 120 may obtain the first direction vector 1711 and a rotational matrix for rotating and converting a coordinate axis (e.g., coordinates (x, y, z) of FIG. 6). When the processor 120 aligns the first direction vector 1711 with respect to the progress direction of the electronic device 101, the alignment direction does not necessarily have to be the progress direction and may be stored as a difference between the progress direction of the electronic device 101 and a sensor value having the measured directionality.

Figure 18:
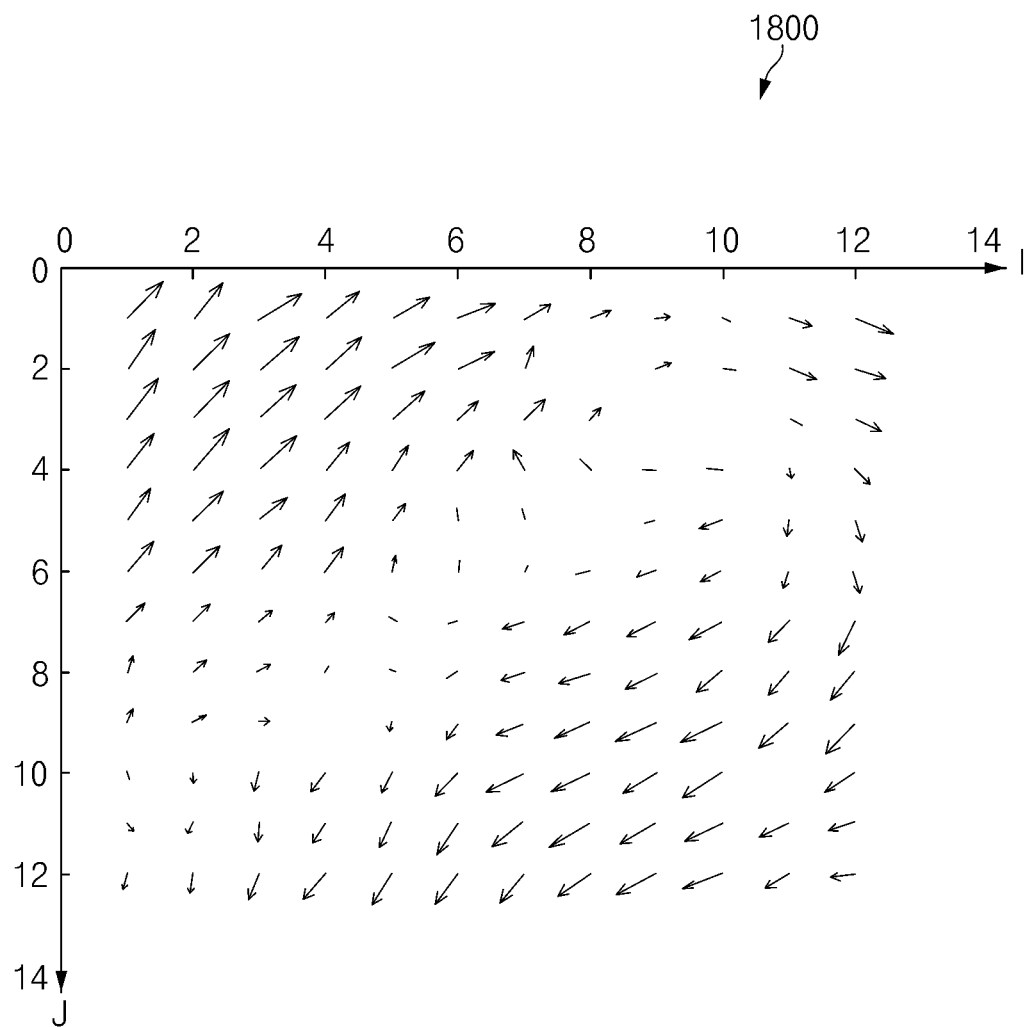
FIG. 18 is a drawing illustrating a magnetic field value of two-dimensional movement line data as a vector according to an embodiment.

FIG. 18 is a drawing 1800 illustrating a magnetic field value of two-dimensional movement line data as a vector according to an embodiment. A processor (e.g., a processor 120 of FIG. 1) of an electronic device (e.g., an electronic device 101 of FIG. 1) may represent a magnetic field value among discrete movement line data for a two-dimensional plane in the form of a vector.

In an embodiment, a plurality of points may be set to magnetic field sample points to measure a magnetic field value. Directions and/or magnitudes of a magnetic field, which are respectively measured at the plurality of points, may be different from each other.

In an embodiment, the processor 120 may estimate an entry point which is a point entering a virtual marker to synchronize a first direction 1001 with a moving direction of the electronic device 101.

In an embodiment, the processor 120 may determine whether the electronic device 101 enters and/or exit a first region on a two-dimensional plane using one-dimensional movement line data where a characteristic of an entry point of at least one one-dimensional movement line data is similar to a characteristic of an entry point of measurement data. A magnetic field value among discrete movement line data for a two-dimensional space may be represented in the form of a vector. Each data on the two-dimensional plane may have a feature distinguished from a value around it according to a location. Thus, a pattern may be used as an example of a method for selecting an entry point. The processor 120 may additionally sample a portion of one-dimensional movement line data and may compare patterns. For example, when the length of the one-dimensional movement line data is composed of 100 samples, the processor 120 may perform pattern comparison using only 10 samples.

In an embodiment, the processor 120 may compare patterns using a shape of a graph based on a plurality of entry points for a one-dimensional movement line. The processor 120 may derive a slope using two entry points for one one-dimensional movement line and may identify a pattern. The processor 120 may define and compare patterns for the one-dimensional movement line as approximate shapes of the graph, such as a monotonous increase, a monotonous decrease, an upward convex shape, and a downward convex shape.

In an embodiment, when an additional signal such as a Bluetooth beacon other than the magnetic field signal is included in discrete movement line data for a two-dimensional plane, the processor 120 may estimate a direction of the movement line data using the additional signal. The processor 120 may align a direction of measured data to correspond to the estimated direction of the movement line data. When the aligned measurement data correspond to the movement line data, the processor 120 may determine that the electronic device 101 enters a specified region.

In an embodiment, the processor 120 may compare a measurement value where a coordinate axis is aligned in the direction of progress with a direction of entry or exit from a virtual marker where the coordinate axis is aligned. The processor 120 may detect access to a specific location and/or object or may reduce complexity of calculation for estimating a location.

When detecting that an electronic device (e.g., an electronic device 101 of FIG. 1) enters a first location, the electronic device 101 may execute a specified event or may request a specified service.

In an embodiment, when it is requested by a service (e.g., a service 530 of FIG. 5), a controller (e.g., a controller 515 of FIG. 5) may request a notification that the electronic device 101 enters the first location. For example, a specific service such as a notification in a reminder application and/or a specific operation in a Bixby routine may be performed. When entering a corresponding place, the service 530 may request the electronic device 101 to perform a specified operation. A notification event, such as the reminder and/or the Bixby routine, according to entry into the first location may be executed.

In an embodiment, a specific location in a vehicle, such as the front of a car audio system, may be registered with a virtual marker. When the electronic device 101 is located at a location where the virtual marker is registered, a specific application such a navigation or music application may be run.

In an embodiment, when the service 530 requests such that the virtual marker recognizes a specific space, the controller 515 may request a receiver (e.g., a receiver 511 of FIG. 5) to maximally collect information about a location where the electronic device 101 may pass while moving when generating the virtual marker. When the service 530 requests to recognize the specific space in the process of detecting the virtual marker, the controller 515 may request a virtual marker detection unit (e.g., a virtual marker detection unit 513 of FIG. 5) to detect whether the electronic device 101 passes through the specific space while moving.

In an embodiment, when the service 530 requests such that the virtual marker recognizes a specific object, the controller 515 may request the receiver 511 to collect information in the form of surrounding the specific object when generating the virtual marker. When the service 530 requests to recognize the specific object in the process of detecting the virtual marker 810, the controller 515 may request the virtual marker detection unit 513 to perform detection of an intended action where a user brings the electronic device 101 to the periphery of the specific object.

In an embodiment, various services 530 such as an advertisement in a mart may be implemented using a virtual marker platform (e.g., a virtual marker platform 510 of FIG. 5). For example, the front of a specific merchandise display stand in the mart may be registered as a virtual marker. When any electronic device enters a location where the virtual marker is registered, the service 530 may notify a user of any electronic device of information about a corresponding product or related marketing information.

In an embodiment, when generating a map in an indoor location service or an indoor location/object memory service based on information having directionality including an Earth's magnetic field, the controller 515 may provide a value for comparison of a vector value measured when tracking a vector and location generated when remembering a location/object or when detecting a location/object, thus providing the service 530 while increasing the accuracy of directionality and decreasing the calculated amount of data.

A method for determining entry of an electronic device into a specific region, which is described in the disclosure, may include estimating a moving direction of the electronic device, aligning a coordinate axis of measurement data, obtained to determine whether the electronic device enters a first region where a virtual marker is registered, in the moving direction, aligning a direction of the coordinate axis of the measurement data in a direction of a coordinate axis of the electronic device when generating the registered virtual marker, and determining entry of the electronic device into the specific region based on the registered virtual marker.

According to certain embodiments, estimating of the moving direction of the electronic device comprises obtaining a change in acceleration in the direction orthogonal to gravity when the electronic device is moved.

According to certain embodiments, estimating of the moving direction of the electronic device described in the disclosure may be to estimate a direction vector, having the highest correlation with acceleration in the direction orthogonal to gravity on a plane orthogonal to acceleration in the direction orthogonal to gravity, as the moving direction of the electronic device.

According to certain embodiments, estimating of the moving direction of the electronic device further comprises accumulating acceleration information over time and estimating an initial direction being a direction moved when the electronic device starts to move based on the acceleration information over time.

According to certain embodiments, aligning the coordinate axis of measurement data comprises synchronizing a progress direction of the electronic device with any axis among coordinate axes of the electronic device and correcting and providing a measured direction vector value to correspond to a rotated coordinate axis to a detection unit.

described in the disclosure may be to generate a first direction vector being data having directionality among pieces of data measured by the electronic device, change a specific coordinate axis of the electronic device such that the specific coordinate axis of the electronic device faces a direction being the same as a first direction being a specified direction, and change the first direction vector to correspond to the changed coordinate axis to generate a second direction vector.

The performing of the first alignment described in the disclosure may be to synchronize a progress direction of the electronic device with any axis among coordinate axes of the electronic device and correct and provide a measured direction vector value to correspond to a rotated coordinate axis to a detection unit.

The performing of the second alignment described in the disclosure may be to determine whether the electronic device enters and/or exit the first region on a two-dimensional plane using one-dimensional movement line data where a characteristic of an entry point of at least one one-dimensional movement line data is similar to a characteristic of an entry point of the measurement data.

The method for determining the entry of the electronic device into the specific region, which is described in the disclosure, may further include registering the virtual marker before estimating the moving direction of the electronic device. The registering of the virtual marker may be to align and store a coordinate axis for a measurement value having directionality in a specified direction or store the measurement value and a progress direction and an orientation of the electronic device.

An electronic device described in the disclosure may include a sensor module that senses sensing data, a wireless communication module that transmits and/or receives a wireless signal, a memory that stores a virtual marker platform, and a processor operatively connected with the sensor module and the memory. The processor may be configured to perform a plurality of operation comprising estimating a moving direction of the electronic device, performing first alignment of aligning a direction of a coordinate axis of measurement data, obtained to determine whether the electronic device enters a first region where a virtual marker is registered, with respect to the moving direction, and performing second alignment of aligning the direction of the coordinate axis of the measurement data in a direction of a coordinate axis of the electronic device when generating a registered virtual marker, and determining entry of the electronic device into a specific region based on the registered virtual marker.

The processor described in the disclosure may obtain a change in acceleration in the direction orthogonal to gravity when the electronic device is moved.

The processor described in the disclosure may estimate a direction vector, having the highest correlation with acceleration in the direction orthogonal to gravity on a plane orthogonal to the acceleration in the direction orthogonal to gravity, as the moving direction of the electronic device.

The processor described in the disclosure may accumulate acceleration information over time and may estimate an initial direction being a direction moved when the electronic device starts to move based on the acceleration information over time.

The processor described in the disclosure may generate a first direction vector being data having directionality among pieces of data measured by the electronic device, change a specific coordinate axis of the electronic device such that the specific coordinate axis of the electronic device faces a direction being the same as a first direction being a specified direction, and change the first direction vector to correspond to the changed coordinate axis to generate a second direction vector.

The processor described in the disclosure may synchronize a progress direction of the electronic device with any axis among coordinate axes of the electronic device and correct and provide a measured direction vector value to correspond to a rotated coordinate axis to a detection unit.

The processor described in the disclosure may determine whether the electronic device enters and/or exit the first region on a two-dimensional plane using one-dimensional movement line data where a characteristic of an entry point of at least one one-dimensional movement line data is similar to a characteristic of an entry point of the measurement data.

The processor described in the disclosure may estimate a departure speed of the electronic device with respect to a coordinate system of the electronic device using a change in acceleration, the change being generated when the electronic device starts to move.

The processor described in the disclosure may estimate a change in speed of the electronic device with respect to a coordinate system of the electronic device online using a gyroscope and/or an accelerometer included in a sensor module of the electronic device.

The processor described in the disclosure may estimate a start of movement of the electronic device by means of a change in acceleration in the direction of gravity.

The processor described in the disclosure may determine that the electronic device starts to move, when there is a change in acceleration over a specified value.

The processor described in the disclosure may obtain a vector value indicating a progress direction of the electronic device and a difference between a measured vector value and a converted vector value or an angle value formed by the progress direction and the measured vector.

According to certain embodiments, a non-transitory computer-readable medium stores a plurality of instructions, where execution of the plurality of instructions by one or more processors causes the one or more processors to perform a plurality of operations comprising: estimating a moving direction of an electronic device; aligning a coordinate axis of measurement data, obtained to determine whether the electronic device enters a first region where a virtual marker is registered, in the moving direction; aligning a direction of the coordinate axis of the measurement data in a direction of a coordinate axis of the electronic device when generating a registered virtual marker, and determining entry of the electronic device into a specific region based on the registered virtual marker.

According to certain embodiments, estimating of the moving direction of the electronic device comprises obtaining a change in acceleration in a direction orthogonal to gravity when the electronic device is moved.

According to certain embodiments, estimating of the moving direction of the electronic device further comprises estimating a direction vector, having a highest correlation on a plane orthogonal to acceleration in the direction of gravity, as the moving direction of the electronic device.

According to certain embodiments, estimating of the moving direction of the electronic device comprises accumulating acceleration information over time and estimating an initial direction being a direction moved when the electronic device starts to move based on the acceleration information over time.

According to certain embodiments, the plurality of operations further comprises: aligning the coordinate axis of measurement data comprises generating a first direction vector being data having directionality among pieces of data measured by the electronic device, changing a specific coordinate axis of the electronic device such that the specific coordinate axis of the electronic device faces a direction being a same as a first direction being a specified direction, and changing the first direction vector to correspond to the changed coordinate axis to generate a second direction vector.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. A method for determining entry of an electronic device into a specific region, the method comprising:
    estimating a moving direction of the electronic device;
    aligning a coordinate axis of measurement data, obtained to determine whether the electronic device enters a first region where a virtual marker is registered, in the moving direction;
    aligning a direction of the coordinate axis of the measurement data in a direction of a coordinate axis of the electronic device when generating a registered virtual marker, and
    determining entry of the electronic device into the specific region based on the registered virtual marker.

2. The method of claim 1, wherein estimating of the moving direction of the electronic device comprises obtaining a change in acceleration in a direction orthogonal to gravity when the electronic device is moved.

3. The method of claim 1, wherein estimating of the moving direction of the electronic device further comprises estimating a direction vector, having a highest correlation on a plane orthogonal to acceleration in the direction of gravity, as the moving direction of the electronic device.

4. The method of claim 1, wherein estimating of the moving direction of the electronic device comprises accumulating acceleration information over time and estimating an initial direction being a direction moved when the electronic device starts to move based on the acceleration information over time.

5. The method of claim 1, wherein aligning the coordinate axis of measurement data comprises generating a first direction vector being data having directionality among pieces of data measured by the electronic device, changing a specific coordinate axis of the electronic device such that the specific coordinate axis of the electronic device faces a direction being a same as a first direction being a specified direction, and changing the first direction vector to correspond to the changed coordinate axis to generate a second direction vector.

6. The method of claim 1, wherein aligning the coordinate axis of measurement data comprises synchronizing a progress direction of the electronic device with any axis among coordinate axes of the electronic device and correcting and providing a measured direction vector value to correspond to a rotated coordinate axis to a detection unit.

7. The method of claim 1, wherein aligning the direction of the coordinate axis of the measurement data in a direction of a coordinate axis of the electronic device comprises determining whether the electronic device enters and/or exit the first region on a two-dimensional plane using one-dimensional movement line data where a characteristic of an entry point of at least one one-dimensional movement line data is similar to a characteristic of an entry point of the measurement data.

8. The method of claim 1, further comprising:
registering the virtual marker before estimating the moving direction of the electronic device,
wherein registering of the virtual marker comprises aligning and storing a coordinate axis for a measurement value having directionality in a specified direction or storing the measurement value and a progress direction and an orientation of the electronic device.

9. An electronic device, comprising:
a sensor module configured to sense sensing data;
a wireless communication module configured to transmit and/or receive a wireless signal;
a memory configured to store a virtual marker platform; and
a processor operatively connected with the sensor module and the memory,
wherein the processor is configured to perform a plurality of operations, the plurality of operations comprising:
estimating a moving direction of the electronic device;
performing first alignment of aligning a direction of a coordinate axis of measurement data, obtained to determine whether the electronic device enters a first region where a virtual marker is registered, with respect to the moving direction;
performing second alignment of aligning the direction of the coordinate axis of the measurement data in a direction of a coordinate axis of the electronic device when generating a registered virtual marker; and
determining entry of the electronic device into a specific region based on the registered virtual marker.

10. The electronic device of claim 9, wherein the plurality of operations further comprises obtaining a change in acceleration in the direction orthogonal to gravity when the electronic device is moved.

11. The electronic device of claim 9, wherein the plurality of operations further comprises estimating a direction vector, having a highest correlation with acceleration in the direction of gravity on a plane orthogonal to the acceleration in the direction of gravity, as the moving direction of the electronic device.

12. The electronic device of claim 9, wherein the plurality of operations further comprises accumulating acceleration information over time and estimating an initial direction being a direction moved when the electronic device starts to move based on the acceleration information over time.

13. The electronic device of claim 9, wherein the plurality of operations further comprises generating a first direction vector being data having directionality among pieces of data measured by the electronic device, changing a specific coordinate axis of the electronic device such that the specific coordinate axis of the electronic device faces a same direction as a first direction, and changing the first direction vector to correspond to the changed coordinate axis to generate a second direction vector.

14. The electronic device of claim 9, wherein the plurality of operations further comprises synchronizing a progress direction of the electronic device with any axis among coordinate axes of the electronic device and corrects and providing a measured direction vector value to correspond to a rotated coordinate axis to a detection unit.

15. The electronic device of claim 9, wherein the plurality of operations further comprises determining whether the electronic device enters and/or exit the first region on a two-dimensional plane using one-dimensional movement line data where a characteristic of an entry point of at least one one-dimensional movement line data is similar to a characteristic of an entry point of the measurement data.

16. A non-transitory computer-readable medium storing a plurality of instructions, where execution of the plurality of instructions by one or more processors causes the one or more processors to perform a plurality of operations comprising:
estimating a moving direction of an electronic device;
aligning a coordinate axis of measurement data, obtained to determine whether the electronic device enters a first region where a virtual marker is registered, in the moving direction;
aligning a direction of the coordinate axis of the measurement data in a direction of a coordinate axis of the electronic device when generating a registered virtual marker, and
determining entry of the electronic device into a specific region based on the registered virtual marker.

17. The non-transitory computer-readable medium of claim 16, wherein estimating of the moving direction of the electronic device comprises obtaining a change in acceleration in a direction orthogonal to gravity when the electronic device is moved.

18. The non-transitory computer-readable medium of claim 16, wherein estimating of the moving direction of the electronic device further comprises estimating a direction vector, having a highest correlation on a plane orthogonal to acceleration in the direction of gravity, as the moving direction of the electronic device.

19. The non-transitory computer-readable medium of claim 16, wherein estimating of the moving direction of the electronic device comprises accumulating acceleration information over time and estimating an initial direction being a direction moved when the electronic device starts to move based on the acceleration information over time.

20. The non-transitory computer-readable medium of claim 16, wherein the plurality of operations further comprises:
- aligning the coordinate axis of measurement data comprises generating a first direction vector being data having directionality among pieces of data measured by the electronic device,
- changing a specific coordinate axis of the electronic device such that the specific coordinate axis of the electronic device faces a direction being a same as a first direction being a specified direction, and
- changing the first direction vector to correspond to the changed coordinate axis to generate a second direction vector.

* * * * *